(12) United States Patent
Homme et al.

(10) Patent No.: US 7,705,315 B2
(45) Date of Patent: Apr. 27, 2010

(54) SCINTILLATOR PANEL AND RADIATION IMAGE SENSOR

(75) Inventors: Takuya Homme, Hamamatsu (JP); Toshio Takabayashi, Hamamatsu (JP); Hiroto Sato, Hamamatsu (JP); Takaharu Suzuki, Hamamatsu (JP); Yoshio Natsume, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 12/213,170

(22) Filed: Jun. 16, 2008

(65) Prior Publication Data

US 2008/0272314 A1  Nov. 6, 2008

Related U.S. Application Data

(63) Continuation of application No. 11/366,492, filed on Mar. 3, 2006, now Pat. No. 7,408,177, which is a continuation of application No. 10/217,628, filed on Aug. 14, 2002, now Pat. No. 7,034,306, which is a continuation-in-part of application No. 09/971,943, filed on Oct. 9, 2001, now abandoned, which is a continuation-in-part of application No. PCT/JP00/02422, filed on Apr. 13, 2000, said application No. 10/217,628 is a continuation-in-part of application No. 09/737,819, filed on Dec. 18, 2000, now Pat. No. 6,469,307, which is a continuation-in-part of application No. PCT/JP99/03264, filed on Jun. 18, 1999.

(30) Foreign Application Priority Data

| Jun. 18, 1998 | (JP) | ................................. 10-171191 |
| Apr. 16, 1999 | (JP) | ............................... P1999-109635 |
| Nov. 5, 2001 | (JP) | ............................... P2001-339741 |
| Jan. 30, 2002 | (JP) | ............................. PCT/JP02/00732 |
| Mar. 7, 2002 | (JP) | ............................... P2002-062435 |
| Mar. 7, 2002 | (JP) | ............................... P2002-062468 |

(51) Int. Cl.
*G01T 1/00* (2006.01)
(52) U.S. Cl. .................................................. 250/368
(58) Field of Classification Search .................. 250/368
See application file for complete search history.

(56) References Cited

U.S. PATENT DOCUMENTS

| 3,944,835 A | 3/1976 | Vosburgh ..................... 250/368 |
| 4,684,592 A | 8/1987 | Matsuda et al. |
| 4,720,426 A | 1/1988 | Englert et al. ............... 250/368 |
| 4,922,105 A | 5/1990 | Hosoi ...................... 250/484.1 |

(Continued)

FOREIGN PATENT DOCUMENTS

EP  0 158 959  10/1985

(Continued)

*Primary Examiner*—Constantine Hannaher
(74) *Attorney, Agent, or Firm*—Drinker Biddle & Reath LLP

(57) ABSTRACT

An Ag film as a light-reflecting film is formed on one surface of an a-C substrate of a scintillator panel. The entire surface of the Ag film is covered with an SiN film for protecting the Ag film. A scintillator having a columnar structure, which converts an incident radiation into visible light, is formed on the surface of the SiN film. The scintillator is covered with a polyparaxylylene film together with the substrate.

1 Claim, 22 Drawing Sheets

U.S. PATENT DOCUMENTS

| | | | | |
|---|---|---|---|---|
| 5,153,438 | A | 10/1992 | Kingsley et al. | 250/370.09 |
| 5,179,284 | A | 1/1993 | Kingsley et al. | 250/368 |
| 5,208,460 | A | 5/1993 | Rougeot et al. | 250/368 |
| 5,227,635 | A | 7/1993 | Iwanczyk | 250/370.12 |
| 5,229,613 | A * | 7/1993 | Pandelisev et al. | 250/368 |
| 5,654,084 | A | 8/1997 | Egert | |
| 5,830,332 | A | 11/1998 | Babich et al. | 204/192.15 |
| 5,848,124 | A | 12/1998 | Inazuru | 378/140 |
| 5,860,584 | A | 1/1999 | Inazuru | 228/121 |
| 6,031,234 | A | 2/2000 | Albagli et al. | 250/370.11 |
| 6,429,430 | B2 | 8/2002 | Sato et al. | 250/363.01 |
| 6,429,437 | B1 | 8/2002 | Laugier | 250/370.11 |
| 6,469,305 | B2 | 10/2002 | Takabayashi et al. | 250/361 |
| 6,469,307 | B2 | 10/2002 | Takabayashi et al. | 250/370.11 |
| 6,531,225 | B1 | 3/2003 | Homme et al. | 428/408 |
| 6,573,506 | B2 | 6/2003 | Sato et al. | 250/361 |
| 6,753,531 | B2 | 6/2004 | Homme et al. | 250/368 |
| 6,762,420 | B2 | 7/2004 | Homme et al. | 250/483.1 |
| 6,777,690 | B2 | 8/2004 | Homme et al. | 250/483.1 |
| 2002/0162965 | A1 | 11/2002 | Okada et al. | 250/370.11 |

FOREIGN PATENT DOCUMENTS

| | | |
|---|---|---|
| EP | 0 303 730 | 2/1989 |
| EP | 0 903 590 | 3/1999 |
| EP | 0 932 053 | 7/1999 |
| EP | 1 024 374 | 8/2000 |
| EP | 1 115 011 | 7/2001 |
| EP | 1 118 878 | 7/2001 |
| EP | 1 118 879 | 7/2001 |
| EP | 1 118 880 | 7/2001 |
| JP | 56-012600 | 2/1981 |
| JP | 56-89702 | 7/1981 |
| JP | 59-122988 | 7/1984 |
| JP | 60-213898 | 10/1985 |
| JP | 61-73901 | 4/1986 |
| JP | 62-173100 | 11/1987 |
| JP | 63-215987 | 9/1988 |
| JP | 63-216000 | 9/1988 |
| JP | 1-191087 | 8/1989 |
| JP | 1-240887 | 9/1989 |
| JP | 1-242983 | 9/1989 |
| JP | 1-267500 | 10/1989 |
| JP | 1-269083 | 10/1989 |
| JP | 2-083489 | 3/1990 |
| JP | 4-174400 | 6/1992 |
| JP | 5-60871 | 3/1993 |
| JP | 05-093780 | 4/1993 |
| JP | 5-107362 | 4/1993 |
| JP | 5-39558 | 6/1993 |
| JP | 5-180945 | 7/1993 |
| JP | 5-188148 | 7/1993 |
| JP | 5-196742 | 8/1993 |
| JP | 5-203755 | 8/1993 |
| JP | 5-295546 | 11/1993 |
| JP | 5-299044 | 11/1993 |
| JP | 6-140613 | 5/1994 |
| JP | 6-174898 | 6/1994 |
| JP | 7-27863 | 1/1995 |
| JP | 7-21560 | 3/1995 |
| JP | 7-201917 | 8/1995 |
| JP | 7-209495 | 8/1995 |
| JP | 7-218698 | 8/1995 |
| JP | 7-270599 | 10/1995 |
| JP | 7-310179 | 11/1995 |
| JP | 8-198687 | 8/1996 |
| JP | 9-061535 | 3/1997 |
| JP | 9-251965 | 9/1997 |
| JP | 9-257944 | 10/1997 |
| JP | 9-303369 | 11/1997 |
| JP | 2000-356679 | 12/2000 |
| JP | 2001-74845 | 3/2001 |
| JP | 2001-183464 | 7/2001 |
| JP | 2001-330674 | 11/2001 |
| JP | 2002-501207 | 1/2002 |
| JP | 2007-279051 | 10/2007 |
| WO | WO 98/36290 | 8/1998 |
| WO | WO 98/36291 | 8/1998 |
| WO | WO 99/38031 | 7/1999 |
| WO | WO 99/66345 | 12/1999 |
| WO | WO 99/66346 | 12/1999 |
| WO | WO 99/66347 | 12/1999 |
| WO | WO 99/66348 | 12/1999 |
| WO | WO 99/66349 | 12/1999 |
| WO | WO 99/66350 | 12/1999 |
| WO | WO 99/66351 | 12/1999 |
| WO | WO 99/67658 | 12/1999 |
| WO | WO 99/67659 | 12/1999 |
| WO | WO 00/62098 | 10/2000 |
| WO | WO 01/51951 A1 | 7/2001 |
| WO | WO 02/061459 | 8/2002 |

* cited by examiner

SCINTILLATOR PANEL AND RADIATION IMAGE SENSOR

RELATED APPLICATIONS

This application is a continuation application of application Ser. No. 11/366,492 filed on Mar. 3, 2006, now U.S. Pat. No. 7,408,177, which is a continuation application of application Ser. No. 10/217,628 filed on Aug. 14, 2002, now U.S. Pat. No. 7,034,306, which is a Continuation-in-Part application of prior U.S. application Ser. No. 09/971,943 filed on Oct. 9, 2001 (now abandoned), which is a Continuation-in-Part application of International Application No. PCT/JP00/02422 filed on Apr. 13, 2000. Application Ser. No. 10/217,628 is also a Continuation-in-Part of prior U.S. application Ser. No. 09/737,819 filed Dec. 18, 2000, now U.S. Pat. No. 6,469,307, which is a Continuation-in-Part application of International Application No. PCT/JP99/03264 filed Jun. 18, 1999, each application being incorporated by reference herein in the entirety.

BACKGROUND OF THE INVENTION

1. Field of the Invention

The present invention relates to a scintillator panel and radiation image sensor which are used for medical X-ray photography or the like.

2. Related Background Art

While X-ray sensitive films have conventionally been used in medical and industrial X-ray photography, radiation imaging systems using radiation detectors have been coming into widespread use from the viewpoint of convenience and storability of photographed results. In such a radiation imaging system, pixel data caused by two-dimensional radiation are acquired as an electric signal by a radiation detector, and this signal is processed by a processing unit, so as to be displayed on a monitor.

SUMMARY OF THE INVENTION

Conventionally known as a typical radiation detector is one having a structure in which a scintillator panel comprising a scintillator formed on a substrate made of aluminum, glass, fused silica, or the like and an imaging device are cemented together. In this radiation detector, the radiation entering from the substrate side is converted by the scintillator into visible light, which is then detected by the imaging device (see JP7-21560A).

Meanwhile, though it is necessary for the scintillator panel to have a sufficiently high optical output in order to attain clear images in a radiation detector, the optical output has not been sufficient in the above-mentioned radiation detector.

It is an object of the present invention to provide a scintillator panel having an enhanced optical output, and a radiation image sensor using a scintillator panel having an enhanced optical output.

A scintillator panel according to the present invention comprises (1) a radiation-transmitting substrate, (2) a light reflective metal thin film disposed on the substrate, (3) a protective film covering an entire surface of the reflective metal thin film, and (4) a scintillator deposited on the protective film. And the protective film has a function to protect the reflective metal thin film against the scintillator.

According to the scintillator panel of the present invention, since the entire surface of the reflective metal thin film is covered with the protective film, any decomposition of this thin film based on water contained in the scintillator in a small amount can be prevented, and any degradation in function of the reflective metal thin film as a reflecting film can be prevented. Hence, an increased optical output of the scintillator panel can be maintained.

Another scintillator panel of the present invention comprises (1) a radiation-transmitting substrate, (2) a reflective metal thin film disposed on the substrate, (3) a protective film disposed on the reflective metal thin film, and (4) a scintillator deposited on the protective film at a position except an edge portion thereof. The reflective metal thin film transmits radiation and reflects light irradiated from the scintillator, and has a function to protect the reflective metal thin film against the scintillator.

According to this scintillator panel, since the scintillator and reflective metal thin film are separated, any decomposition of this film based on water contained in the scintillator in a small amount can be prevented, and any degradation in function of the reflective metal thin film as a reflecting film can be prevented. Hence, an increased optical output of the scintillator panel can be maintained.

The reflective film may be directly or indirectly disposed on the substrate. And the reflective film may be substantially made of a material containing a substance selected from the group consisting of Al, Ag, Cr, Cu, Ni, Ti, Mg, Rh, Pt, and Au.

The protective film may be an inorganic film like a metal oxide film or an organic film like polyimide. The inorganic film may be substantially made of a material containing a substance selected for the group consisting of LiF, $MgF_2$, $SiO_2$, $TiO_2$, $Al_2O_3$, MgO, SiN. Or the metal oxide film may be an oxidized material of the reflective metal thin film.

The protective film preferably comprises an inorganic film such as SiN and an organic film such as polyimide.

The scintillator may be covered with an organic film. According to this configuration, the water-vapor resistance of the scintillator can be improved.

Preferably, the organic film further covers at least an outer periphery of said protective film. According to this configuration, the organic film covers over the scintillator and the outer periphery of said protective film and reaches to the surface of the substrate around the protective film. Whereby the water-vapor resistance of the scintillator can be further improved as compared to a structure in which only the scintillator is covered with an organic film. And the scintillating material depositing outside the scintillator layer is prevented to contact with the reflective metal thin film.

If this organic film further covers an entire surface of the substrate then it is preferable to further improve the water-vapor resistance as compared to a structure in which only the scintillator and at least part of the substrate surface are covered with an organic film.

A radiation image sensor according to the present invention is characterized in that an image sensing element is arranged to face the scintillator of the scintillator panel. According to the radiation image sensor of the present invention, since the scintillator panel can maintain an increased optical output, the output of the radiation image sensor can be maintained.

DESCRIPTION OF THE PREFERRED EMBODIMENTS

Figure 1:
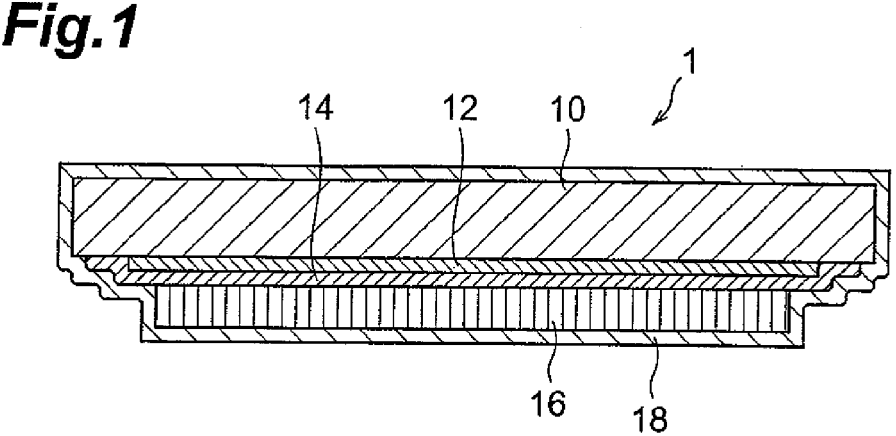
FIG. 1 is a sectional view of a scintillator panel according to the first embodiment.

We will describe some preferred embodiments of the present invention hereinafter. To facilitate the comprehension of the explanation, the same reference numerals denote the same parts, where possible, throughout the drawings, and a repeated explanation will be omitted.

The first embodiment of the present invention will be described below with reference to FIGS. 1 and 2. FIG. 1 is a sectional view of a scintillator panel 1, and FIG. 2 is a sectional view of a radiation image sensor 2.

As shown in FIG. 1, an Ag film 12 as a light-reflecting film (reflective metal thin film) is disposed on one surface of an amorphous carbon (a-C) (glassy carbon or glass-like carbon) substrate 10 of the scintillator panel 1. The surface of the Ag film 12 is covered with an SiN film 14 for protecting the Ag film 12. A scintillator 16 with a columnar structure, which converts incident radiation into visible light, is made on the surface of the SiN film 14. Tl-doped CsI is used as the scintillator 16. This scintillator 16 is covered with a polyparaxylylene film 18 together with the substrate 10.

Figure 2:
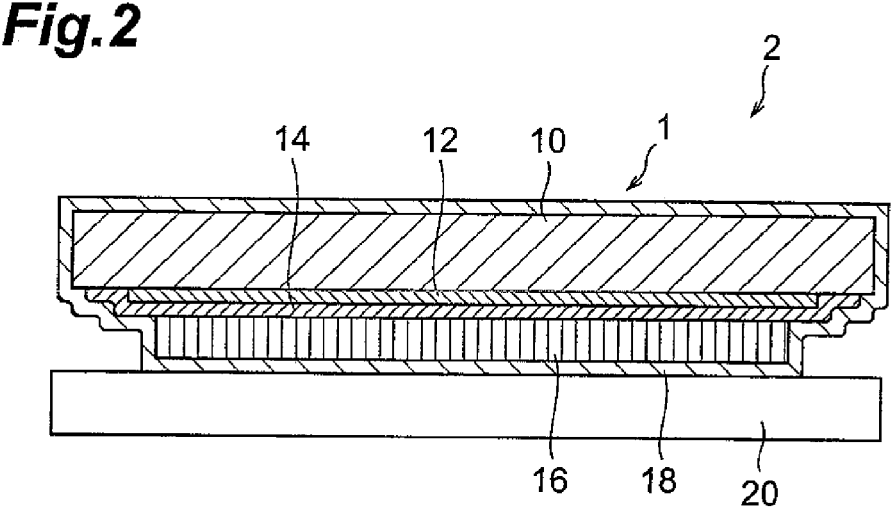
FIG. 2 is a sectional view of a radiation image sensor according to the first embodiment.

The radiation image sensor 2 has a structure in which an image sensing element 20 is bonded to the distal end portion side of the scintillator 16 of the scintillator panel 1, as shown in FIG. 2.

The making process of the scintillator panel 1 will be described. First, an Ag film 12 as a light-reflecting film is formed to a thickness of 150 nm on one surface of a rectangular or circular a-C substrate 10 (thickness: 1 mm) by vacuum deposition. An SiN film 14 is formed to a thickness of 200 nm on the Ag film 12 by plasma CVD to cover the entire surface of the Ag film 12.

A columnar crystal of Tl-doped CsI is grown (deposited) on the surface of the SiN film 14 by deposition, thereby forming a scintillator 16 having a thickness of 250 μm. CsI that forms the scintillator 16 has high hygroscopicity, and if the scintillator is kept exposed, it absorbs vapor in air and deliquesces. To prevent this deliquescence, a polyparaxylylene film 18 is formed by CVD. That is, the substrate 10 with the scintillator 16 formed is placed in a CVD apparatus, and a polyparaxylylene film 18 is deposited to a thickness of 10 μm. With the above process, the polyparaxylylene film 18 is formed on the entire surfaces of the scintillator 16 and substrate 10 (the entire substrate surface that is exposed without any scintillator or the like).

The radiation image sensor 2 is manufactured by bonding the light-receiving portion of the image sensing element (CCD) 20 to the distal end portion side of the scintillator 16 of the completed scintillator panel 1 (FIG. 2).

According to the radiation image sensor 2 of this embodiment, radiation incident from the substrate 10 side is converted into light by the scintillator 16 and detected by the image sensing element 20. Since the scintillator panel 1 of the radiation image sensor 2 has the Ag film 12 as a reflective metal thin film, the light incident on the light-receiving portion of the image sensing element 20 can be increased, and a clear image can be detected by the radiation image sensor 2. In addition, since the Ag film 12 is wholly covered with the SiN film 14 that functions as a protective film for the Ag film 12, the function for a reflecting film of the Ag film 12 can be prevented from being damaged by decomposition due to corrosion or the like. Furthermore, when the scintillator 16 is deposited the CsI deposits not only on the region on the SiN film 14 but also deposits outside of the SiN film 14. According to the present invention, the outer periphery of the SiN film 14 is covered over the polyparaxylylene film 18, the CsI which deposits outside of the SiN film 14 cannot intrude into the SiN film 14 and cannot contact with Ag film 12. So the Ag film 12 is effectually protected against the CsI.

The second embodiment of the present invention will be described next. In the second embodiment to be described below, the same reference numerals as in the scintillator panel 1 and radiation image sensor 2 of the first embodiment denote the same components in the second embodiment.

Figure 3:
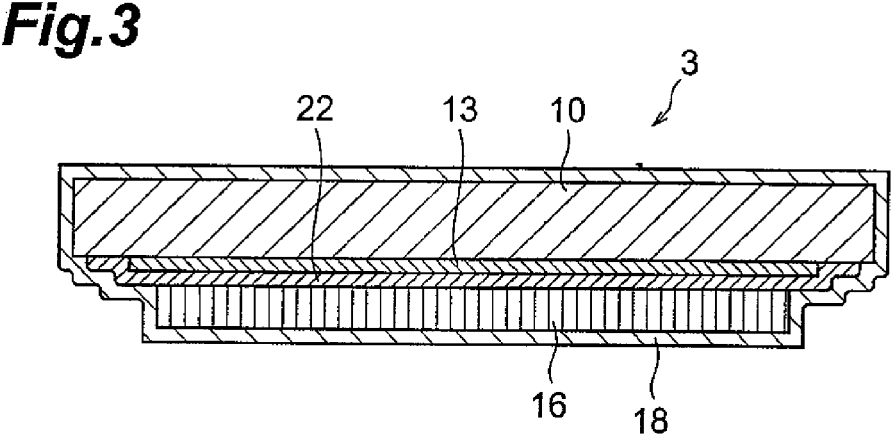
FIG. 3 is a sectional view of a scintillator panel according to the second embodiment.

FIG. 3 is a sectional view of a scintillator panel 3. As shown in FIG. 3, an Al film 13 serving as a reflecting film is formed on one surface of an a-C substrate 10 of the scintillator panel 3. The surface of the Al film 13 is covered with a polyimide film 22 for protecting the Al film 13. A scintillator 16 with a columnar structure, which converts incident radiation into visible light, is formed on the surface of the polyimide film 22. Tl-doped CsI is used as the scintillator 16. This scintillator 16 is covered with a polyparaxylylene film 18 together with the substrate 10.

A radiation image sensor is constructed by bonding an image sensing element to the distal end portion side of the scintillator 16 of the scintillator panel 3.

The making process of the scintillator panel 3 will be described. First, an Al film 13 as a light-reflecting film is formed to a thickness of 150 nm on one surface of a rectangular or circular a-C substrate 10 (thickness: 1 mm) by vacuum deposition. A polyimide film 22 is formed to a thickness of 1,000 nm on the Al film 13 by a spin coat process to cover the entire surface of the Al film 13.

A columnar crystal of Tl-doped CsI is grown on the surface of the polyimide film 22 by deposition, thereby forming a scintillator 16 having a thickness of 250 μm. CsI that forms the scintillator 16 has high hygroscopicity, and if the scintillator is kept exposed, it absorbs vapor in air and deliquesces. To prevent this deliquescence, the polyparaxylylene film 18 is formed by CVD. That is, the polyparaxylylene film 18 is formed on the entire surfaces of the scintillator 16 and substrate 10.

The radiation image sensor is manufactured by bonding the light-receiving portion of an image sensing element (CCD) 20 to the distal end portion side of the scintillator 16 of the completed scintillator panel 3.

According to the radiation image sensor using the scintillator panel 3 of this embodiment, radiation incident from the substrate 10 side is converted into light by the scintillator 16 and detected by the image sensing element 20. Since the scintillator panel 3 of the radiation image sensor has the Al film 13 as a reflective metal thin film, the light incident on the light-receiving portion of the image sensing element can be increased, and a clear image can be detected by the radiation image sensor. In addition, since the Al film 13 is wholly covered with the polyimide film 22 that functions as a protective film for the Al film 13, the Al film 13 as a reflecting film can be prevented from being damaged in function by a decomposition due to corrosion or the like.

The third embodiment of the present invention will be described next. In the third embodiment to be described below, the same reference numerals as in the scintillator panel 1 and radiation image sensor 2 of the first embodiment denote the same components in the third embodiment.

Figure 4:
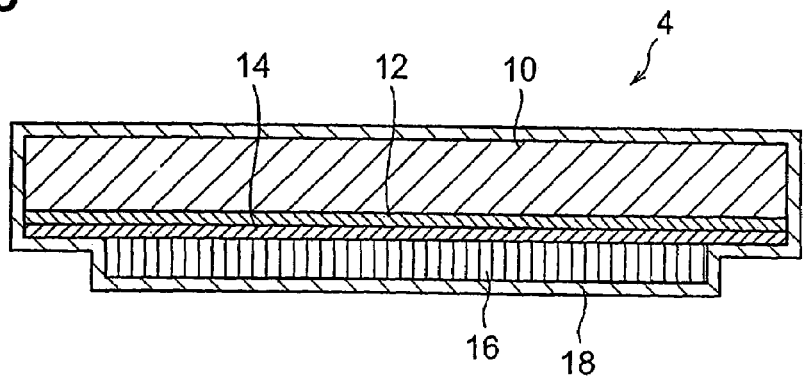
FIG. 4 is a sectional view of a scintillator panel according to the third embodiment.

FIG. 4 is a sectional view of a scintillator panel 4. As shown in FIG. 4, an Ag film 12 as a light-reflecting film is formed on one surface of an a-C substrate 10 of the scintillator panel 4. An SiN film 14 for protecting the Ag film 12 is formed on the entire surface of the Ag film 12. A scintillator 16 with a columnar structure, which converts an incident radiation into visible light, is formed on the surface of the SiN film 14.

The scintillator 16 is formed at a position except the edge portion on the SiN film 14 so that the scintillator 16 located on the outer side is separated from the edge portion of the Ag film 12. Tl-doped CsI is used as the scintillator 16. This scintillator 16 is covered with a polyparaxylylene film 18 together with the substrate 10.

A radiation image sensor is constructed by bonding an image sensing element to the distal end portion side of the scintillator 16 of the scintillator panel 4.

According to the radiation image sensor using the scintillator panel 4 of this embodiment, radiation incident from the substrate 10 side is converted into light by the scintillator 16 and detected by an image sensing element 20. Since the scintillator panel 4 of the radiation image sensor has the Ag film 12 as a reflective metal thin film, the light incident on the light-receiving portion of the image sensing element 20 can be increased, and a clear image can be detected by the radiation image sensor. In addition, since the edge portion of the Ag film 12 is separated from the scintillator 16, the Ag film 12 as a reflecting film can be prevented from being damaged in function by a decomposition due to corrosion or the like.

Figure 5:
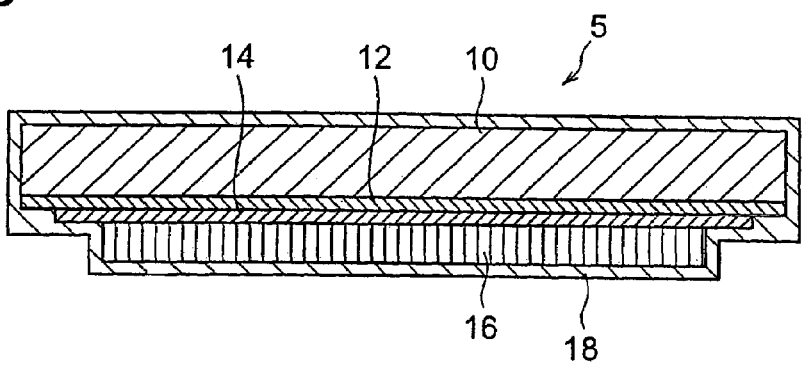
FIG. 5 is a sectional view of a modification of this embodiment.

In the scintillator panel 4 according to the third embodiment, the SiN film 14 is formed on the entire surface of the Ag film 12. However, as in a scintillator panel 5 shown in FIG. 5, the SiN film 14 may be formed at a position except the edge portion of the Ag film 12, and the scintillator 16 may be formed at a position except the edge portion of the SiN film 14. Even in this case, since the edge portion of the Ag film 12 is separated from the scintillator 16, the Ag film 12 as a reflecting film can be prevented from being damaged in function by a decomposition due to corrosion or the like.

The fourth embodiment of the present invention will be described next. In the fourth embodiment to be described below, the same reference numerals as in the scintillator panel 1 and radiation image sensor 2 of the first embodiment denote the same components in the fourth embodiment.

Figure 6:
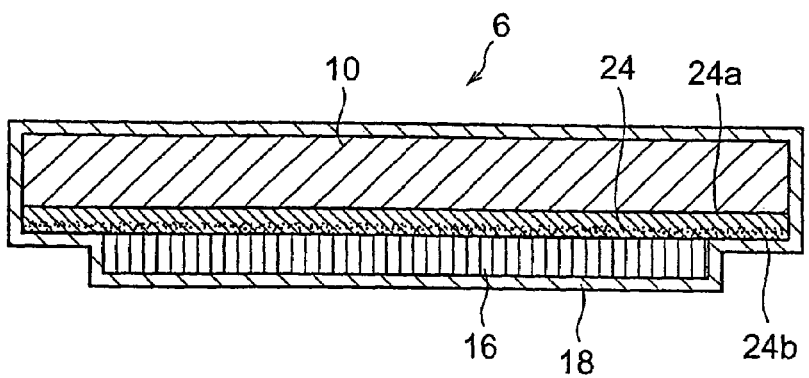
FIG. 6 is a sectional view of a scintillator panel according to the fourth embodiment.

FIG. 6 is a sectional view of a scintillator panel 6. As shown in FIG. 6, an Al film 24 made of an Al film 24a and Al$_2$O$_3$ film (oxide film) 24b is formed on one surface of an a-C substrate 10 of the scintillator panel 6. A scintillator 16 with a columnar structure, which converts an incident radiation into visible light, is formed on the Al$_2$O$_3$ film 24b on the surface of the Al film 24. Tl-doped CsI is used as the scintillator 16. This scintillator 16 is covered with a polyparaxylylene film 18 together with the substrate 10.

A radiation image sensor is constructed by bonding an image sensing element to the distal end portion side of the scintillator 16 of the scintillator panel 6.

The making process of the scintillator panel 6 will be described. First, an Al film 24 as a light-reflecting film is formed to a thickness of 150 nm on one surface of a rectangular or circular a-C substrate 10 (thickness: 1 mm) by vacuum deposition. Subsequently, Al is evaporated while supplying oxygen gas, thereby forming an Al$_2$O$_3$ film 24b having a thickness of 30 nm on the entire surface of the Al film 24a.

A columnar crystal of Tl-doped CsI is grown on the surface of the Al$_2$O$_3$ film 24b by deposition, thereby forming a scintillator 16 having a thickness of 250 μm. CsI that forms the scintillator 16 has high hygroscopicity, and if the scintillator is kept exposed, it absorbs vapor in air and deliquesces. To prevent this deliquescence, a polyparaxylylene film 18 is formed by CVD. That is, the polyparaxylylene film 18 is formed on the entire surfaces of the scintillator 16 and substrate 10.

A radiation image sensor is constructed by bonding an image sensing element to the distal end portion side of the scintillator 16 of the scintillator panel 6.

According to the radiation image sensor using the scintillator panel 6 of this embodiment, radiation incident from the substrate 10 side is converted into light by the scintillator 16 and detected by an image sensing element 20. Since the scintillator panel 6 of the radiation image sensor has the Al film 24a as a reflective metal thin film, the light incident on the light-receiving portion of the image sensing element 20 can be increased, and a clear image can be detected by the radiation image sensor.

Figure 7:
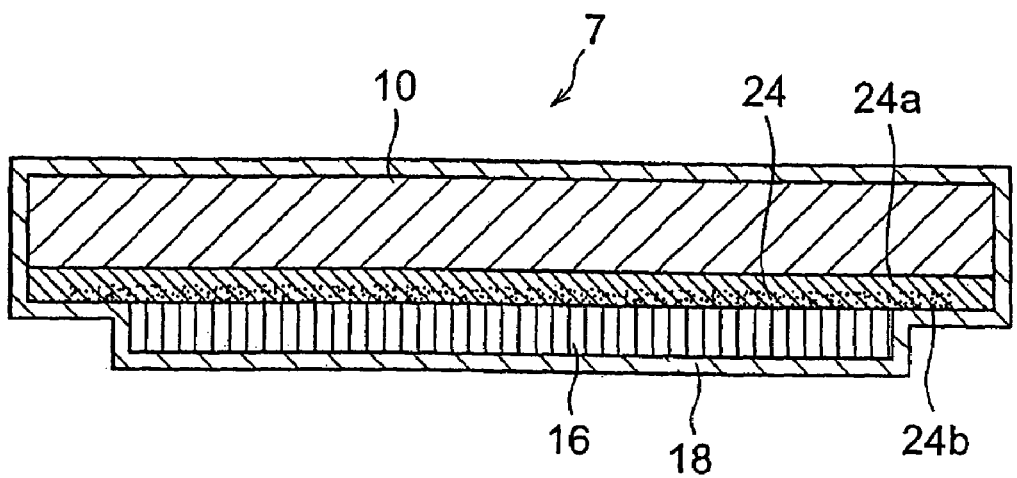
FIG. 7 is a sectional view of a modification to the scintillator panel according to the fourth embodiment.

In addition, since the Al film 24a is wholly covered with the $Al_2O_3$ film 24b as a protective film for the Al film 24a, the Al film 24a as a reflecting film can be prevented from being damaged in function by a decomposition due to corrosion or the like. In addition, since the edge portion of the Ag film 12 is separated from the scintillator 16, the Ag film 12 as a reflecting film can be prevented from being damaged in function by a decomposition due to corrosion or the like. In the scintillator panel 6 according to the fourth embodiment, the $Al_2O_3$ film 24b is formed on the entire surface of the Al film 24a. However, as in a scintillator panel 7 shown in FIG. 7, the $Al_2O_3$ film 24b may be formed at a position except the edge portion of the Al film 24a. Even in this case, since the edge portion of the Al film 24 is separated from the scintillator 16, the Al film 24a as a reflecting film can be prevented from being damaged in function by a decomposition due to corrosion or the like.

In the above-described embodiments, an a-C substrate is used. However, since the substrate only need to pass radiation, a graphite substrate, Al substrate, Be substrate, or glass substrate may be used.

In the above-described embodiments, when an Al oxide film on the substrate is used as a protective film, a polyimide film as a protective film is also preferably formed on the oxide film. In this case, the Al film can be completely protected by the oxide film and polyimide film.

Figure 8:
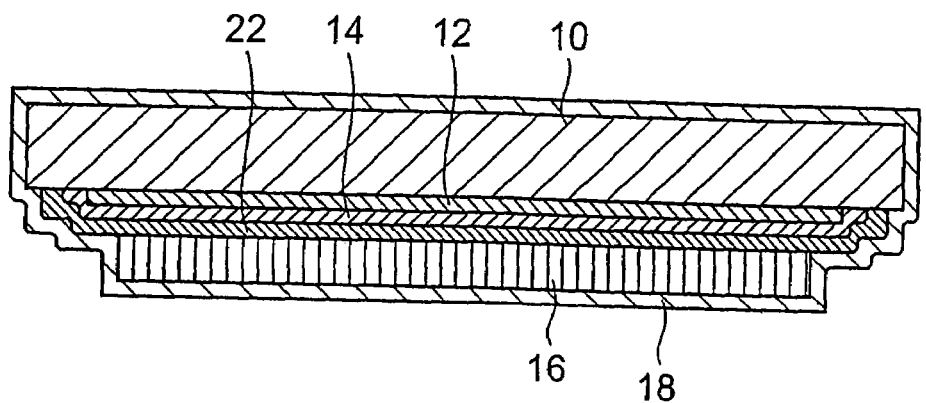
FIGS. 8 and 9 are sectional views of modifications of this embodiment.

In the above-described embodiments, an SiN film or polyimide film is used as a protective film. However, the present invention is not limited to this. A film made of a material containing a substance selected from the group consisting of transparent inorganic films such as LiF, $MgF_2$, $SiO_2$, $Al_2O_3$, $TiO_2$, MgO, and SiN and a transparent organic film such as polyimide may be used. Alternatively, a protective film formed from inorganic and organic films may be used, as shown in FIG. 8. That is, in a scintillator panel shown in FIG. 8, an Ag film 12 as a light-reflecting film is formed on one surface of an a-C substrate 10. The surface of the Ag film 12 is covered with the SiN film (inorganic film) 14 for protecting the Ag film 12, and the surface of the SiN film 14 is covered with a polyimide film (organic film) 22. A scintillator 16 having a columnar structure is formed on the surface of the polyimide film 22. The scintillator 16 is covered with a polyparaxylylene film 18 together with the substrate 10. When a protective film formed from inorganic and organic films is used, as in the scintillator panel shown in FIG. 8, the effect for protecting the light-reflecting film can be further improved.

In the above-described embodiments, an Ag film or Al film is used as a reflective metal thin film. However, a film made of a material containing a substance selected from the group consisting of Al, Ag, Cr, Cu, Ni, Ti, Mg, Rh, Pt, and Au may be used. In addition, two or more reflective metal thin films may be formed by forming, e.g., an Au film on a Cr film.

In the above-described embodiments, when a film made of a material containing a substance selected from the group consisting of Al, Ag, Cr, Cu, Ni, Ti, Mg, Rh, and Pt is used as a reflective metal thin film, an oxide film thereof can be used as a protective film.

Figure 9:
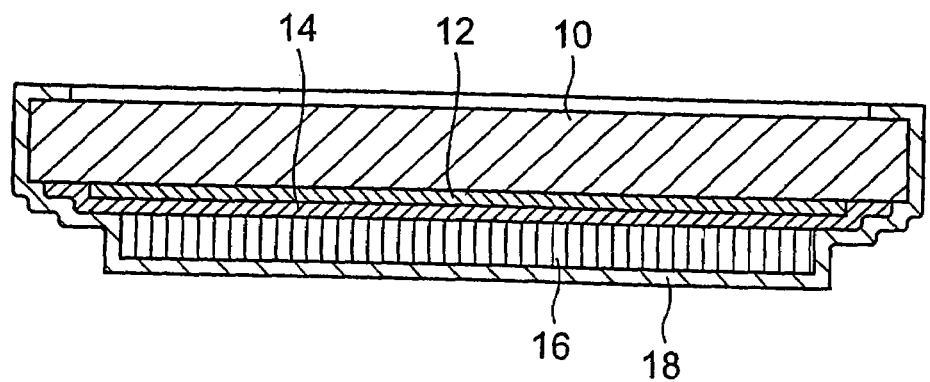

In the above-described embodiments, the entire surfaces of the scintillator 16 and substrate (the surface with the scintillator formed and a surface on the opposite side, i.e., the radiation incident surface) are covered with the polyparaxylylene film 18, thereby making the scintillator completely resistant against water vapor. When the entire surface of the scintillator 16 and at least part of the surface of the substrate 10 are covered with the polyparaxylylene film 18, as shown in FIG. 9, the water-vapor resistance of the scintillator can be made higher than in a case wherein only the scintillator is covered.

The fifth embodiment of the present invention will be described next. In the fifth embodiment to be described below, the same reference numerals as in the scintillator panels 1 and 3 and the radiation image sensor 2 of the first and second embodiments denote the same components in the fifth embodiment.

Figure 10:
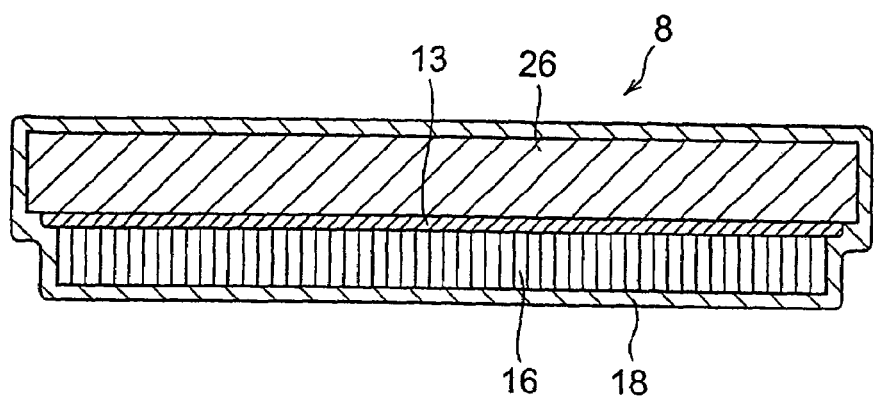
FIG. 10 is a sectional view of a scintillator panel according to the fifth embodiment.

As shown in FIG. 10, a scintillator panel 8 has a glass substrate 26 having a flat shape. An Al film 13 as a reflecting film is formed to a thickness of 100 nm on one surface of the substrate by vacuum deposition. A 250-μm thick scintillator 16 with a columnar structure, which converts an incident radiation into visible light, is formed on the surface of the Al film 13. Tl-doped CsI grown by deposition is used for the scintillator 16.

The entire surface of the scintillator 16 is covered with a 10-μm thick polyparaxylylene film (transparent organic film) 18 formed by CVD, together with the substrate 26.

Figure 11:
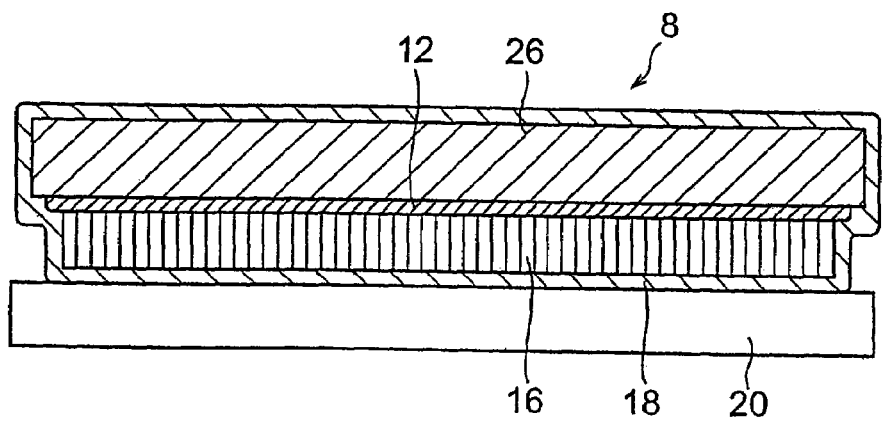
FIG. 11 is a sectional view of a radiation image sensor according to the fifth embodiment.

A radiation image sensor has a structure in which an image sensing element 20 is bonded to the distal end portion side of the scintillator 16 of the scintillator panel 8, as shown in FIG. 11.

According to the radiation image sensor of this embodiment, radiation incident from the substrate 26 side is converted into light by the scintillator 16 and detected by the image sensing element 20. Since the scintillator panel 8 of the radiation image sensor has the Al film 13 as a reflecting film, the light incident on the light-receiving portion of the image sensing element 20 can be increased, and a clear image can be detected by the radiation image sensor.

The substrate used for the scintillator panel 8 is preferably made thin to increase the radiation transmittance. When a glass substrate is used, a given rigidity can be ensured as compared to an Al substrate or a-C substrate even when the panel size is increased as in a scintillator panel used for a radiation image sensor for chest. For this reason, any deflection of the substrate can be prevented in forming a scintillator on the glass substrate. Hence, the scintillator can easily be formed on the substrate, and the quality of the formed scintillator can be maintained. As a type of glass to be used for the glass substrate of this embodiment, Pyrex glass is preferably used because of its cost and a small content of radiation absorbing component.

The sixth embodiment of the present invention will be described next. In the sixth embodiment to be described below, the same reference numerals as in the scintillator panel 5 and radiation image sensor of the fifth embodiment denote the same components in the sixth embodiment.

Figure 12:
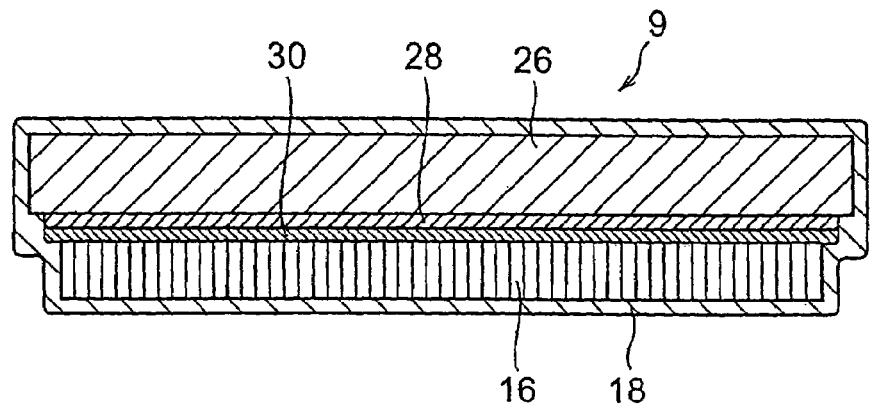
FIG. 12 is a sectional view of a scintillator panel according to the sixth embodiment.

As shown in FIG. 12, a scintillator panel 9 has a glass substrate 26 having a flat shape. A Cr film 28 as a reflecting film is formed to a thickness of 100 nm on one surface of the substrate by vacuum deposition. An Au film 30 is formed on the surface of the Cr film 28, and a 250-μm thick scintillator 16 with a columnar structure is formed on the surface of the Au film 30. Tl-doped CsI grown by deposition is used as the scintillator 16.

The entire surface of the scintillator 16 is covered with a 10-μm thick polyparaxylylene film (transparent organic film) 18 formed by CVD, together with the substrate 26. A radiation image sensor has a structure in which an image sensing element 20 is bonded to the distal end portion side of the scintillator 16 of the scintillator panel 9.

Since the reflecting film of the scintillator panel according to this embodiment is formed from the Cr film 28 with good adhesion to the glass substrate and the Au film 30 with good bonding to Cr, the reflecting film can have high stability.

In the above-described embodiments, a film made of a material containing a substance selected from the group consisting of Al, Ag, Cr, Cu, Ni, Ti, Mg, Rh, Pt, and Au may be used as a reflective metal thin film.

Figure 14:
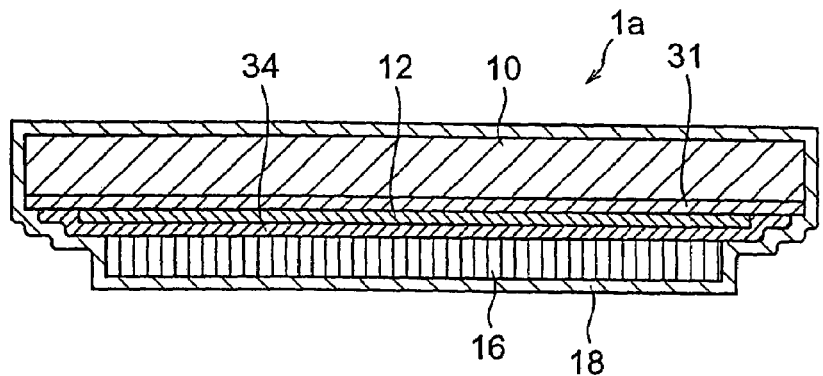
FIG. 14 is a sectional view of a seventh embodiment of the scintillator panel according to the present invention.

Next, the seventh embodiment of the present invention will be described. FIG. 14 is a sectional view of the scintillator panel 1a of the seventh embodiment, and FIG. 15 is a sectional view of the radiation image sensor 2a which is used in the scintillator panel 1a.

As is illustrated in FIG. 14, a polyimide intermediate film 31 is disposed on one surface of the amorphous carbon (a-C) (glassy carbon or glass-like carbon) substrate 10 of the scintillator panel 1a by adhesion, and a metal thin film 12 which functions as a light-reflecting film is formed on the surface of this intermediate film 31 by adhesion. This metal thin film is manufactured from Al, for example. The surface of this metal thin film 12 is covered by a polyimide protective film 34 for protecting the metal thin film 12. As a result, the metal thin film 12 is sandwiched between, and thus sealed by, the intermediate film 31 and the protective film 34 to which it is adhered. A scintillator 16 with a columnar structure, which converts incident radiation into visible light, is formed on the surface of the protective film 34. In other words, the structure of the scintillator 16 is such that a large number of columnar crystals stand grouped together on the protective film 34. Further, a Tl-doped CsI is used in the scintillator 16. This scintillator 16, as well as the substrate 10, is covered with a polyparaxylylene moisture-resistant protective film 18.

Figure 15:
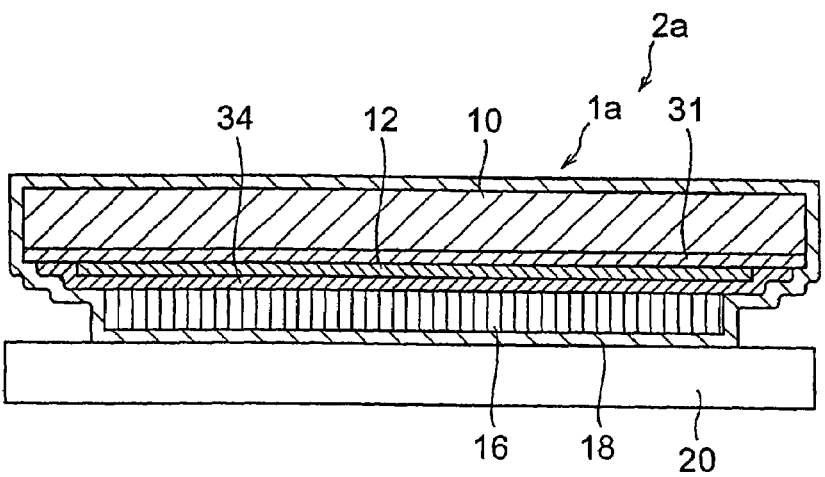
FIG. 15 is a sectional view of a seventh embodiment of the radiation image sensor according to the present invention, which is used in this scintillator panel.

As is shown in FIG. 15, the radiation image sensor 2 has a configuration in which the light-receiving surface of an image-sensing element 20 is affixed to the side of the scintillator panel 1a on which the scintillator 16 is formed.

Next, the making process for the scintillator panel 1a will be explained. First, polyimide resin is painted onto one surface of the rectangular or circular a-C substrate 10 (thickness: 1 mm) at a constant thickness (10 μm) and caused to harden, thereby becoming adhered to the substrate 10 and forming the intermediate film 31 with a flat surface.

The metal thin film 12 which functions as a light-reflecting film is formed on the surface of this intermediate film 31 at a thickness of 150 nm by vacuum deposition. The polyimide constituting the intermediate film 31 has a good affinity with the Al metal thin film 12, and hence, the metal thin film 12 becomes adhered to the intermediate film 31. Since the intermediate film 31 is also adhered to the substrate 10, peeling away of the metal thin film 12 from the substrate 10 can be effectively prevented.

Subsequently, spin coat processing is applied onto the metal thin film 12, thus forming a polyimide protective film 34 at a thickness of 1000 nm which covers the entire metal thin film 12. As a result, the metal thin film 12 is sandwiched between the intermediate film 31 and the protective film 34 so as to be adhered to and sealed by both, and hence can be effectively protected from damage or peeling in the subsequent making process.

Next, a large number of Tl-doped CsI columnar crystals are grown (accumulated) by deposition on the surface of the protective film 34 so as to stand grouped together, thereby forming the scintillator 16 at a thickness of 250 μm. The CsI that forms the scintillator 16 has high hygroscopicity, and if left exposed, absorbs vapor in the air and deliquesces. In order to prevent this, the polyparaxylylene moisture-resistant protective film 18 is formed by CVD. That is, the substrate 10 on which the scintillator 16 is formed is inserted into a CVD device, and the moisture-resistant protective film 18 is formed at a thickness of 10 μm. The making method for this moisture-resistant protective film 18 is described in detail in International Publication No. WO99/66351. Thereby, the polyparaxylylene moisture-resistant protective film 18 is formed on substantially the entire surface of the scintillator 16 and the substrate 10, or in other words, substantially the entire surface of the substrate that is exposed and does not have a scintillator or the like formed thereon. According this process the protective film 18 is not formed at positions corresponding to the support protrusions of a target-support element each of which supports the substrate during CVD process. The words "substantially the entire surface" means almost entire surfaces except these portions.

The radiation image sensor 2a is made by disposing the light-receiving portion of a image sensing element (CCD) 20 to face the distal end side of the scintillator 16 of the completed scintillator panel 1a and bonding them (see FIG. 15).

In the above-described embodiment, the intermediate film may include either an organic film or an inorganic film, or a combination of the two.

According to the radiation image sensor 2a of this embodiment, radiation which enters from the substrate 10 side is converted into light by the scintillator 16 and detected by the image sensing element 20. Since the light-reflecting metal thin film 12 is provided in the scintillator panel 1a comprising the radiation image sensor 2, the amount of light incident on the light-receiving portion of the image-sensing element 20 can be increased, and the image detected by the radiation image sensor 2 can be made clearer. Further, since the metal thin film 12 is adhered to the polyimide intermediate film 31 and the protective film 34, and thus sandwiched between the two to seal the entire film, damage to the function of the metal thin film 12 as a reflecting film due to deterioration such as corrosion, peeling, or other impairments, can be prevented, and the stability thereof as a reflecting film can be improved.

Figure 16:
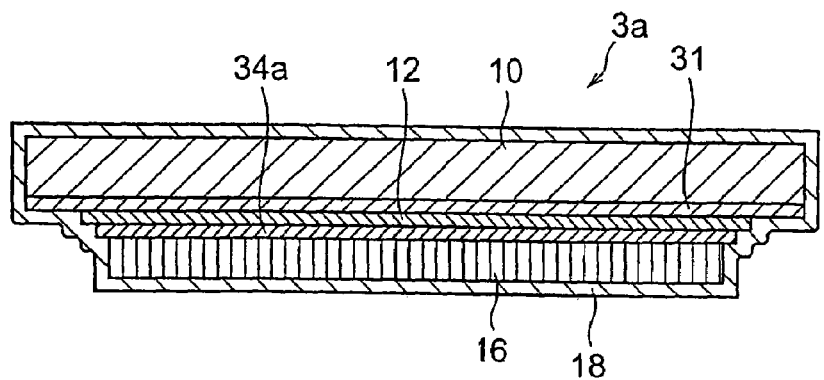
FIG. 16 is a sectional view of an eighth embodiment of the scintillator panel according to the present invention.

FIG. 16 is a sectional view of an eighth embodiment of the scintillator panel in accordance with the present invention. This scintillator panel 3a differs from the first embodiment in that the protective film 34a does not cover the entire surface of the metal thin film 12, but rather covers only the central part of the metal thin film 12. In this embodiment also, the scintillator 16 is formed only on the surface of the protective film 34a, and thus the metal thin film 12 is completely prevented from contacting the scintillator 16 by the protective film 34a.

In this embodiment also, at least the scintillator 16 formation part of the metal thin film 12 is sandwiched between, and sealed by, the intermediate film 31 and the protective film 34a, and hence, damage, peeling, deterioration and the like can be effectively prevented, and the stability of the metal thin film 12 as a reflecting film can be improved.

Figure 17:
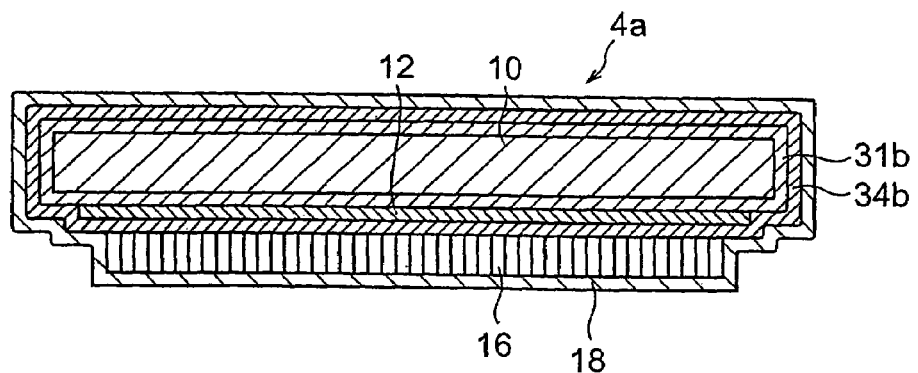
FIG. 17 is a sectional view of a ninth embodiment of the scintillator panel according to the present invention.

FIG. 17 is a sectional view of the ninth embodiment of the scintillator panel in accordance with the present invention. This scintillator panel 4a differs from those of the seventh and eighth embodiments, illustrated in FIGS. 14 and 16, in that a polyparaxylylene film which is the same as the moisture-resistant protective film 18 is used as the intermediate film 31b and the protective film 34b. Furthermore, the intermediate film 31b covers the entire substrate 10, and the protective film 34b covers the metal thin film 12 and the exposed intermediate film 31b on the periphery of the metal thin film 12.

Similarly to the case of the aforementioned moisture-resistant protective film 18, the intermediate film 31b and the protective film 34b are formed by CVD, thus forming a satisfactory thin film that is uniform and has no pin holes or the like. As a result the metal thin film 12 is sealed, and contact with the outside air and the scintillator 16 which is formed on the protective film 34b is completely prevented, and thereby, reactions of the metal with scintillator components and moisture can be suppressed. In particular, during the formation of the scintillator 16, the protective film 34b completely covers the substrate 10 and the metal thin film 12, and thus even the effects of the scintillator components becoming attached to another location can be suppressed. Furthermore, by interposing the intermediate film 31b, which is a nonconductor, between the substrate 10 and the metal thin film 12, which have conducting properties, electrical contact between the substrate 19 and the metal thin film 12 can be prevented, and electric corrosion of the metal thin film 12 can be effectively suppressed.

Here, an embodiment was explained in which the intermediate film 31b and the protective film 34b cover the entire substrate 10; however, it is sufficient if the metal thin film 12 is formed on the surface of the intermediate film 31b, and the intermediate film 31b may be formed on only the formation surface side of the scintillator 16 on the substrate. It is also sufficient if the protective film 34b is formed on at least the formation surface part of the scintillator 16, as in the eighth embodiment. However, if a structure such as that of the present embodiment is employed, wherein the intermediate film 31b and the protective film 34b cover the entire substrate 10, sealing is improved, and the formation of the films by CVD is simple, and therefore this structure is preferable.

Figure 18:
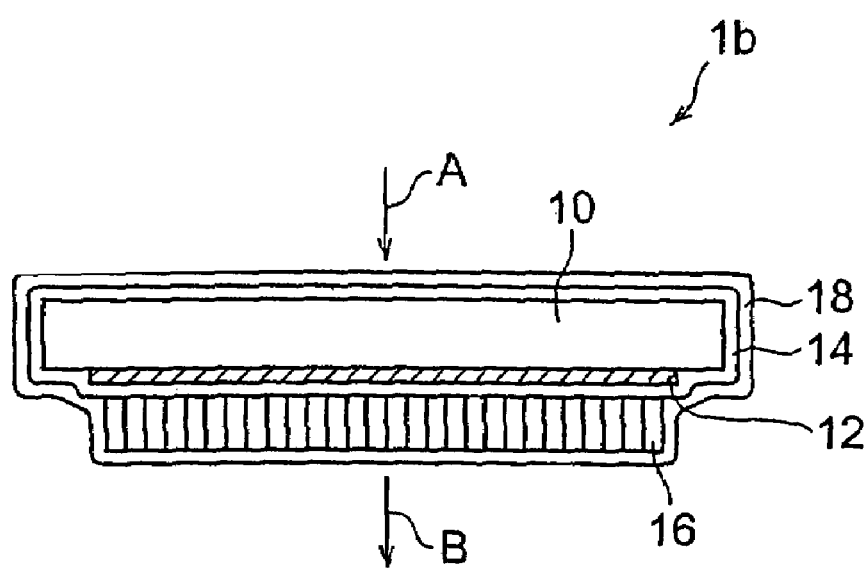
FIG. 18 is a sectional constitutional diagram showing a tenth embodiment of the scintillator panel according to the present invention.

A tenth embodiment of the scintillator panel in accordance with the present invention will now be explained. FIG. 18 is a sectional view showing this scintillator panel 1b. In the scintillator panel 1b, a metal reflective film 12 is formed on one surface of the radiolucent substrate 10 (made of a material in which the main component is glass, amorphous carbon, or another carbon). This metal reflective film 12 is comprised of a material containing one of Al, Ag, Cr, Cu, Ni, Ti, Mg, or Rh. A protective organic film 14 is formed so as to envelop the substrate 10 from above the metal reflective film 12. This protective organic film 14 is made, for example, from polyparaxylylene. A scintillator 16 which converts into visible light incident radiation that has passed through the substrate 10 is formed on the portion of the surface where the metal reflective film 12 and the protective organic film 14 are laminated. A Tl-doped CsI, for example, is used in this scintillator 16. The CsI has a configuration in which a large number of needle crystals stand grouped together. This scintillator 16, as well as the substrate 10, is covered by a moisture-proof organic film 18 made of polyparaxylylene.

Next, the making process of this scintillator panel 1b will be explained with reference to FIGS. 18, 19A through 19D, and 20. First, a rectangular or circular substrate 10 (thickness: 1 mm) is prepared (see FIG. 19A), and the metal reflective film 12 is formed on a surface thereof at a thickness of 150 nm by vacuum deposition (see FIG. 19B).

Next, the polyparaxylylene protective organic film 14 is formed on the metal reflective film 12 by CVD. In other words, the substrate 10 with the metal reflective film 12 deposited thereon is inserted into a CVD device, whereby the moisture-proof organic film 12 is formed over the entire surface of the substrate 10 at a thickness of 10 μm. As a result, the metal reflective film 12 is covered, and the polyparaxylylene protective organic film 14 is formed covering substantially the entire substrate 10, from the periphery of the metal reflective film 12 to the side walls and moreover to the rear surface thereof (see FIG. 19C). This organic film making method is described in detail in International Publication No. WO99/66351.

Subsequently, a large number of Tl-doped CsI needle crystals are grown (accumulated) by deposition in a predetermined area on the surface of the protective organic film 14 on the metal reflective film 12, and thus the scintillator 16 is formed at a thickness of 250 μm (see FIGS. 19D, 20). At the time of this deposition, the substrate 10 which is covered by the protective organic film 14 is housed in a cavity portion 200x of a deposition holder 200, and only the part of the substrate 10 on which the scintillator 16 is to be formed (the aforementioned predetermined area) is exposed to the deposition chamber 400 side through an opening 201 provided in the deposition holder 200. Thereby, the scintillator 16 can be selectively formed in a substantially predetermined area. It is conceivable that the scintillator components that pass through the opening 201, that is, one part of the CsI component, pass through the gap between the protective organic film 14 and the floor surface of the cavity portion 200x, thus becoming attached to the protective organic film 14 on the side wall of the substrate 10; however, these components almost never reach the protective organic film 14 on the rear surface side of the substrate 10. If a cover plate 300 is disposed on the rear surface of the substrate 10 to cover the rear surface of the substrate 10, attachment to this rear surface can be completely prevented, and it is therefore preferable to provide this cover plate 300.

The CsI which forms this scintillator 16 has high hygroscopicity, and if left exposed, absorbs vapor in the air and deliquesces. In order to prevent this, the scintillator 16 is further covered by a polyparaxylylene moisture-proof organic film 18 (thickness: 10 μm), thereby completing the scintillator panel 1b illustrated in FIG. 18. This moisture-proof organic film 18 may be formed using the same making method as for the protective organic film 14.

In the scintillator panel 1b of this embodiment, the protective organic film 14 covering the metal reflective film 12 does not only cover the metal reflective film 12, but also covers the substrate 10 from the periphery of the metal reflective film 12 to the side wall parts and furthermore to the rear surface thereof. Therefore, even when scintillator components which have passed through the opening 201 become attached to the protective organic film 14, these scintillator components can be securely prevented from penetrating between the protective organic film 14 and the substrate 10 to reach the metal reflective film 12. Thus, deterioration of the metal reflective film 12 can be suppressed, and the durability thereof can be improved. Moreover, peeling of the protective organic film 14 can be securely prevented.

In this scintillator panel 1b, as illustrated in FIG. 18, the scintillator 16 is disposed facing the opposite side to the radiation entrance side, and the image-sensing element, television camera and so on are disposed and used on the scintillator 16 side. Radiation enters the scintillator panel 1b from the direction of arrow A, penetrates the moisture-resistant protective film 14, protective organic film 14, substrate 10, metal reflective film 12, and protective organic film 14 in succession, and reaches the scintillator 16. Here, the radiation is absorbed by the scintillator 16 and emitted as visible light.

Of the emitted visible light, the light directed toward the substrate 10 side passes through the transparent protective organic film 14, and is thereafter reflected by the metal reflective film 12 to return to the scintillator 16 side. As a result, the bulk of the light emitted from the scintillator 16 passes through the moisture-resistant protective film 14 and is radiated in the direction of arrow B. In the image-sensing element or television camera (not shown), this optical image is captured, whereby an image signal corresponding to a radiographic image can be obtained.

Figure 21:
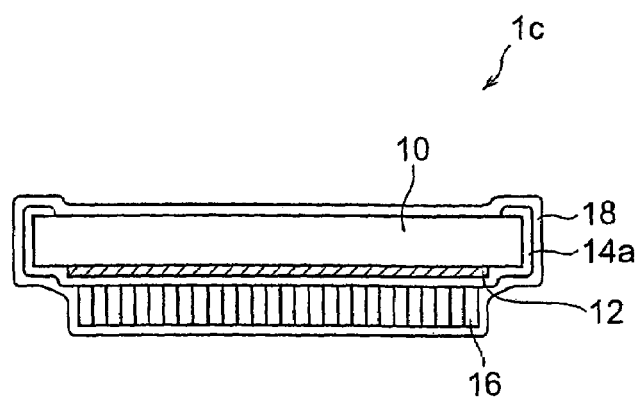
FIG. 21 is a sectional constitutional diagram showing an eleventh embodiment of the scintillator panel according to the present invention.

This protective organic film 14 does not have to cover the entire rear surface of the substrate 10; it is sufficient if the protective organic film 14 covers the side wall part and extends to the edges of the rear surface side, as does the protective organic film 14a in the eleventh embodiment, shown in FIG. 21. In this case, even if scintillator components become attached to the rear surface part of the substrate 10 which is exposed during the deposition of the scintillator 16, the protective organic film 14a becomes adhered to the side wall of the substrate 10 such that penetrating between the protective organic film 14a and the substrate 10 becomes difficult. Furthermore, the scintillator components are covered and encapsulated by the moisture-resistant organic film 14 in a subsequent procedure, and thus undergo no further movement, meaning that deterioration of the metal reflective film 12 can be suppressed.

Figure 22:
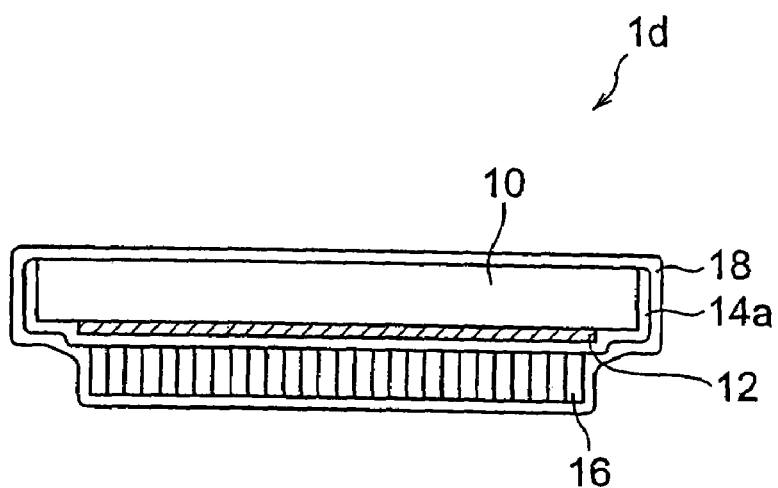
FIGS. 22 and 23 are sectional constitutional diagrams showing a twelfth embodiment of the scintillator panel according to the present invention and an example of modification thereof.
Figure 23:
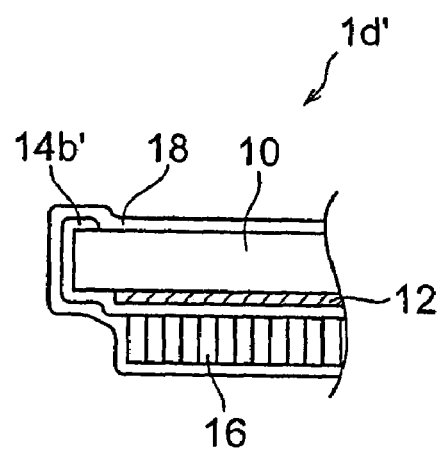

FIGS. 22 and 23 are sectional views showing the twelfth embodiment of the scintillator panel according to the present invention and an example of a modification thereof respectively. These embodiments differ from the tenth and eleventh embodiments in that a film made of polyimide is used as the protective organic films 14b and 14b'.

Figure 19A:
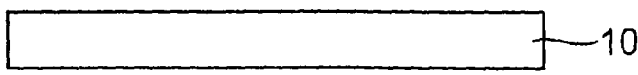
FIGS. 19A through 19D are views showing the making process thereof.
Figure 19B:
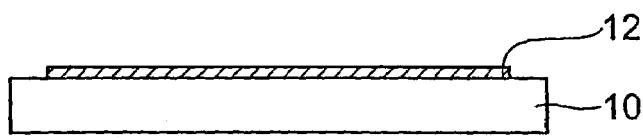
Figure 19C:
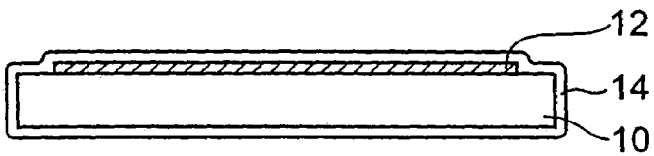

These polyimide protective organic films 14b and 14b' can be made following the making process of the metal reflective film 12, shown in FIG. 19B, by applying polyimide resin over the metal reflective film 12 down to the side walls of the substrate 10 at a constant thickness (10 μm) and causing this resin to harden.

Here also, when a protective organic film is formed using polyimide resin, the protective organic film 14b must be formed up to the edges of the side walls and the rear surface of the substrate 10, as is shown in FIG. 22, and it is preferable that the protective organic film 14b' be formed over the rear surface edges, as is shown in FIG. 23.

Figure 24:
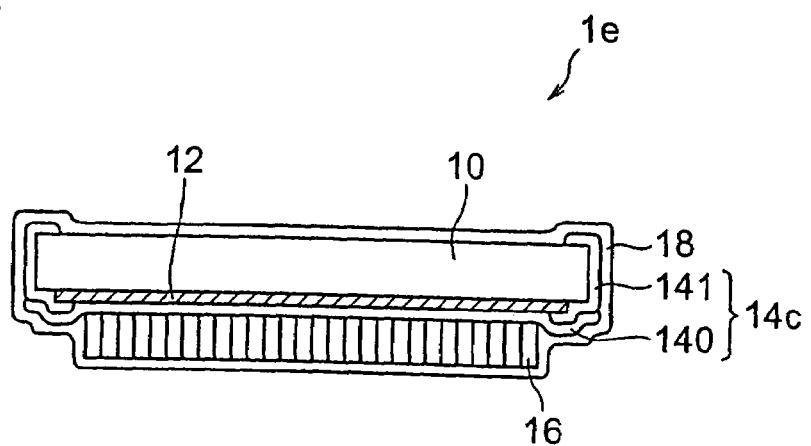
FIGS. 24 and 25 are sectional constitutional diagrams showing a thirteenth embodiment of the scintillator panel according to the present invention and an example of modification thereof.
Figure 25:
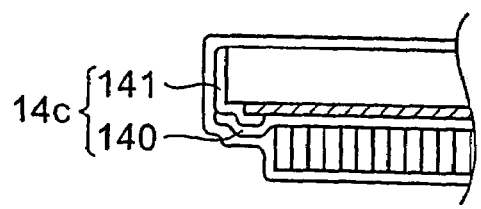

FIGS. 24 and 25 are sectional views showing the thirteenth embodiment of the scintillator panel according to the present invention and an example of a modification thereof. These embodiments are similar to the twelfth embodiment in that a polyimide protective organic film 14c is used, but differ in that the protective organic film 14c comprises two parts: a second protective organic film 141 in the form of a picture frame casing which principally covers the side walls of the substrate 10; and a first protective organic film 140 in a substantially planar form, which principally covers the metal reflective film 12.

Here, the second protective organic film 141 is formed over the side walls of the substrate 10 from the peripheral edges of the metal reflective film 12. As is shown in FIG. 24, it is preferable that the second protective organic film 141 extend to the rear surface of the substrate 10; however, it is acceptable for this film to extend to the edges of the rear surface of the substrate 10, as is shown in FIG. 25.

Figure 26A:
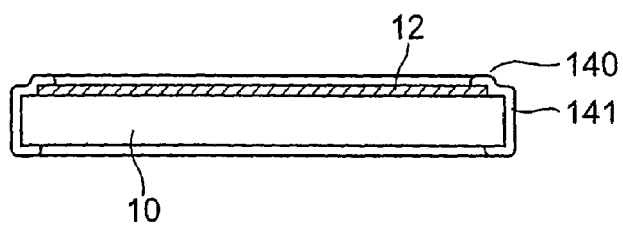
FIGS. 26A through 26C are explanatory views of the making process of the scintillator panel of FIG. 24.

Next, the making method of this scintillator panel 1e will be explained. This method is identical to the making process for the scintillator panel 1b illustrated in FIGS. 19A and 19B up to the manufacture of the metal reflective film 12. Thereafter, polyimide resin is painted onto the side walls of the substrate 10 and the proximal substrate surfaces up to the peripheral edges of the metal reflective film 12, and then this resin is hardened, thus forming the second protective organic film 141 in a frame shape (see FIG. 26A). The second protective organic film 141 may also be formed by affixing resin in the form of a tape or a film rather than by painting.

Figure 26B:
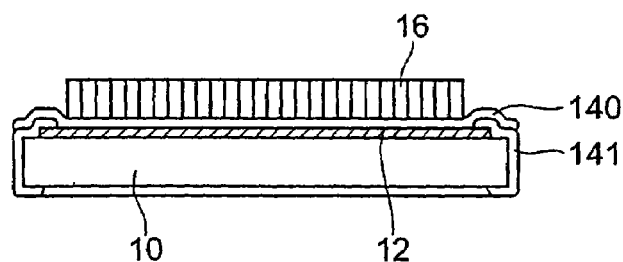
Figure 26C:
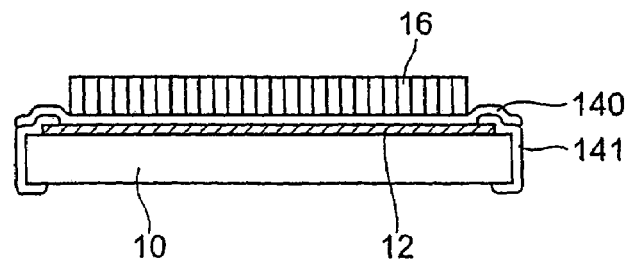

Next, polyimide resin is painted onto the second protective organic film 141 over the metal reflective film 12 and around the periphery thereof, and then caused to harden, thus forming the first protective organic film 140 in planar form to cover the metal reflective film 12 (see FIG. 26B). Thereafter, similarly to the process in FIG. 19D, a large number of Tl-doped CsI needle crystals are grown by deposition in a predetermined area on the surface of the protective organic film 14c (actually, the first protective organic film 140) over the metal reflective film 12, and thus the scintillator 16 is formed (see FIG. 26c). To complete the scintillator panel 1e illustrated in FIG. 24, the scintillator 16 is covered with a moisture-proof organic film 18 made of polyparaxylylene.

Informing the protective organic film 14c in two stages in this way, the resins which are formed on the side wall sections and on the metal reflective film can be made to have different qualities and formulae, and it is thus possible to combine them such that each exhibits suitable performance. Furthermore, formation is easier when the resin is painted on than integrated formation, and the shielding ability of the resin can be secured.

FIGS. 27A through 27D are sectional views showing the fourteenth embodiment of the scintillator panel according to the present invention and an example of modification thereof. In these embodiments, the order of lamination of the first protective organic film 142 and the second protective organic film 143 is made to be different from that of the thirteenth embodiment. That is, in these embodiments, the second protective organic film 143 covers the peripheral edges of the first protective organic film 142.

Figure 27A:
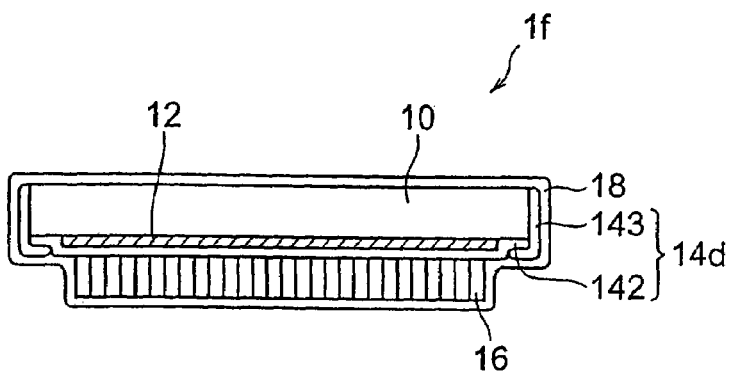
FIGS. 27A through 27D are sectional constitutional diagrams showing a fourteenth embodiment of the scintillator panel according to the present invention and an example of modification thereof.
Figure 27B:
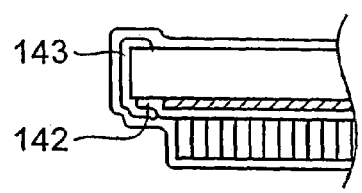
Figure 27C:
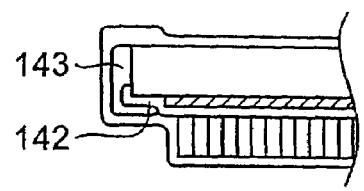
Figure 27D:
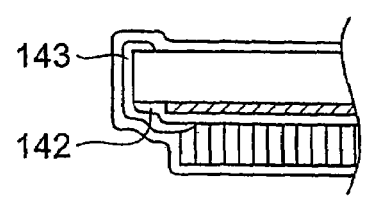

Here, as illustrated in FIG. 27A, it is sufficient for the second protective organic film 143 to extend to the edges of the rear surface of the substrate 10, but it is preferable that this film extend to the rear surface of the substrate 10, as shown in FIG. 27B. On the other hand, it is acceptable for the first protective organic film 142 to extend to the side walls of the substrate 10, as shown in FIG. 27C. It is also acceptable for the second protective organic film 143 to extend to the peripheral edges of the metal reflective film 12, as shown in FIG. 27D.

Figure 28A:
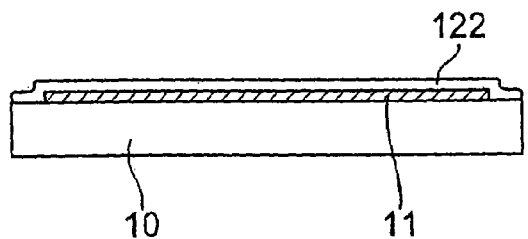
FIGS. 28A through 28C are explanatory views of the making process of the scintillator panel of FIG. 27A.

Next, the making method for this scintillator panel 1f will be explained. This method is the same as the making process of the scintillator panel 1b shown in FIGS. 19A and B up to the manufacture of the metal reflective film 12. Thereafter, polyimide resin is painted over the metal reflective film 12 and the surfaces of the substrate 10 on the periphery of the metal reflective film 12, and then caused to harden, thus forming the first protective organic film 142 in planar form, covering the metal reflective film 12 (see FIG. 28A).

Figure 28B:
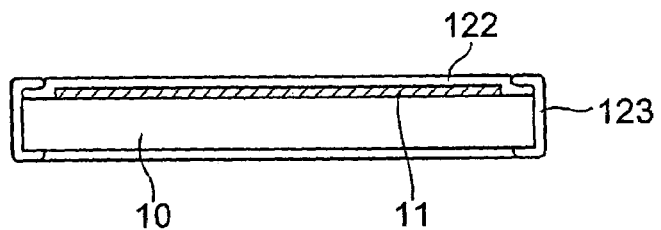

Subsequently, polyimide resin is painted onto the side walls of the substrate 10 and the proximal substrate surfaces up to the peripheral edges of the first protective organic film 142, and then caused to harden, thus forming the second protective organic film 143 in a frame shape (see FIG. 28B). The second protective organic film 143 may be formed by affixing resin molded into the form of a tape or film rather than by painting on the resin.

Figure 19D:
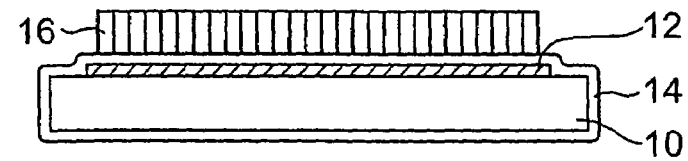
Figure 20:
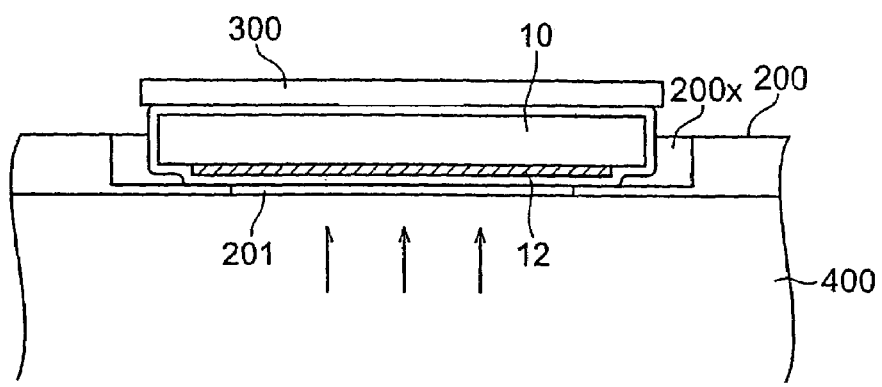
FIG. 20 is a detailed explanatory view of the scintillator deposition process.
Figure 28C:
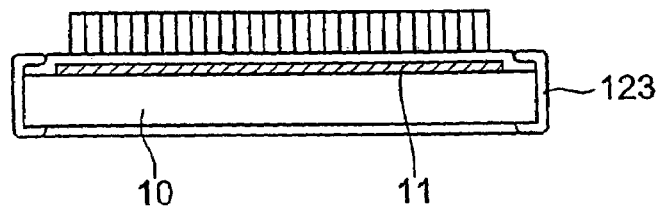

Next, similarly to the process in FIG. 19D, a large number of Tl-doped CsI needle crystals are grown by deposition in a predetermined area on the surface of the protective organic film 14d (actually the first protective organic film 142) over the metal reflective film 12, thus forming the scintillator 16 (see FIG. 28C). To complete the scintillator panel 1d shown in FIG. 27A, the scintillator 16 is covered with a moisture-proof organic film 18 made of polyparaxylylene.

In this embodiment also, the protective organic film 14d is formed in two stages, and thus the same effects as those of the thirteenth embodiment may be obtained.

Figure 29:
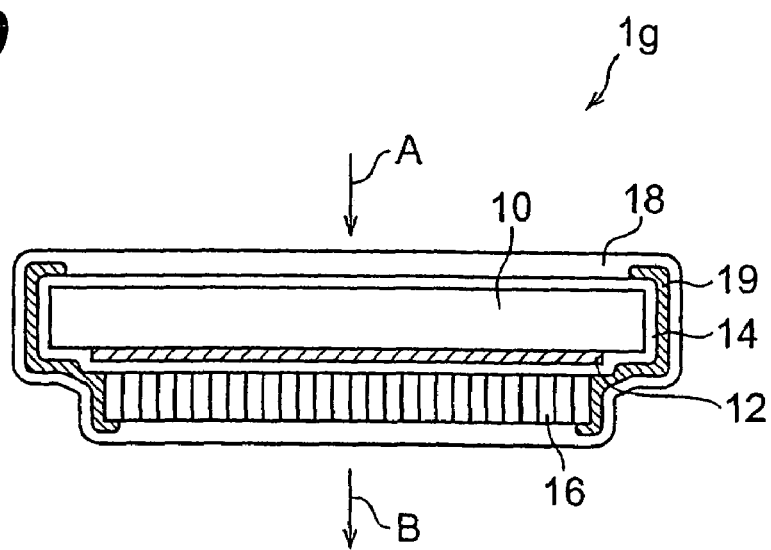
FIG. 29 is a sectional constitutional diagram showing a fifteenth embodiment of the scintillator panel according to the present invention.

FIG. 29 is a sectional constitutional diagram showing the fifteenth embodiment of the scintillator panel according to the present invention. In this scintillator panel 1g, the metal reflective film 12 is formed on one surface of the radiolucent substrate 10 (made of a material in which the main component is glass, amorphous carbon, or another carbon). This metal reflective film 12 is comprised of a material containing one of Al, Ag, Cr, Cu, Ni, Ti, Mg, or Rh. A first protective organic film 14 is formed so as to envelop the substrate 10 from above the metal reflective film 12. This first protective organic film 14 is made, for example, from polyparaxylylene. A scintillator 16 which converts into visible light incident radiation that has passed through the substrate 10 is formed on the portion of the surface thereof on which the metal reflective film 12 and the first protective organic film 14 are laminated. A Tl-doped CsI, for example, is used as this scintillator 16. The CsI has a configuration in which a large number of needle crystals stand grouped together. A second protective organic film 19 is formed in the shape of a picture frame covering an area extending from the peripheral edges of the top surface of the scintillator 16 to the edges of the rear surface of the substrate 10. This protective organic film 19 is made of polyimide, for example. This second protective organic film 19 adheres to the side walls of the scintillator 16 and also adheres to the first protective organic film 10, thereby covering the surfaces of the substrate 10 on the periphery of the scintillator 16 and the side walls of the substrate 10 from over the first protective organic film 14. The entire scintillator panel 1g is substantially covered with a polyparaxylylene moisture-proof organic film 18.

Figure 31A:
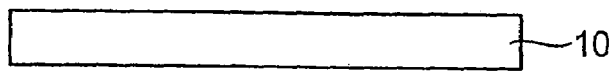
FIGS. 31A through 31E are views showing the making process of the scintillator panel of FIG. 29.

Next, the making method of this scintillator panel 1g will be explained. First, a rectangular or circular substrate 10 (thickness: 1 mm) is prepared (see FIG. 31A), and a metal reflective film 12 is formed on a surface thereof at a thickness of 150 nm by vacuum deposition (see FIG. 31B).

Next, a protective organic film 14 made of polyparaxylylene is formed on the metal reflective film 12 by CVD. In other words, the substrate 10 with the metal reflective film 12 deposited thereon is placed in a CVD device, wherein a moisture-proof film 12 is formed over the entire surface of the substrate 10 at a thickness of 10 µm. In so doing, a polyparaxylylene protective organic film 14 is formed, covering the metal reflective film 12 and also substantially covering the entire substrate 10, from the periphery of the substrate reflective film 11 to the side walls thereof, and furthermore to the rear surface thereof (see FIG. 31C). The making method for this organic film is described in detail in International Publication No. WO99/66351.

Figure 31B:
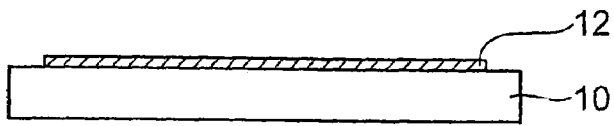
Figure 31C:
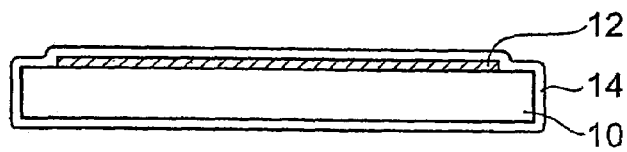
Figure 31D:
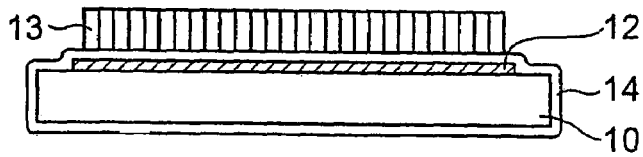

Next, a large number of Tl-doped CsI needle crystals are grown by deposition in a predetermined area on the surface of the protective organic film 14 over the metal reflective film 12, thus forming the scintillator 16 at a thickness of 250 µm (see FIG. 31D).

Figure 31E:
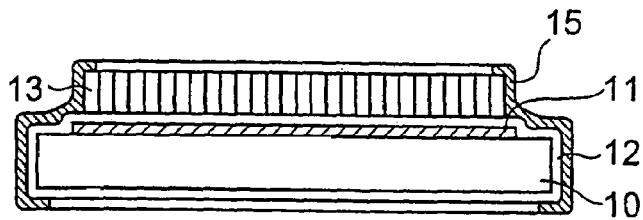

Subsequently, polyimide tape is wound and fixed around the part extending from the peripheral edges of the top surface of the scintillator 16, over the exposed wall surfaces of the scintillator 16 and the exposed first protective organic film 14 on the periphery of the scintillator 16, up to the peripheral edges of the rear surface of the substrate 12, thus forming the second protective organic film 19 (see FIG. 31E). Polyimide resin which has been molded into sheet form may be used as this tape, as may tape to which an adhesive has been applied, such as Kapton Tape by E. I. du Pont de Nemours and Company.

The CsI that forms the scintillator 16 has high hygroscopicity, and if left exposed, absorbs vapor in the air and deliquesces. In order to prevent this, the scintillator 16 is covered with a polyparaxylylene moisture-proof organic film 18 (thickness: 10 µm), thus completing the scintillator panel 1g as shown in FIG. 29. This moisture-proof organic film 18 may be formed by the same making process as the protective organic film 14.

As is shown in FIG. 29, this scintillator panel 1g is disposed such that the scintillator 16 faces the opposite side to the radiation entrance side, and the image-sensing element, television camera and so on are disposed and used on the scintillator 16 side. It goes without saying that an optical system which is not illustrated may be used to lead output images from the scintillator 16 to the image-sensing element, television camera or the like.

Radiation enters the scintillator panel 1g from the direction of the arrow A, passes through the moisture-resistant protective film 14, the first protective organic film 14, the substrate 10, the metal reflective film 12, and the first protective organic film 14 in succession, and reaches the scintillator 16. Here, the radiation is absorbed by the scintillator 16 and emitted as visible light. Of the emitted visible light, the light directed toward the substrate 10 side passes through the transparent protective organic film 14, and is thereafter reflected by the metal reflective film 12 to return to the scintillator 16 side. As a result, the bulk of the light emitted from the scintillator 16 passes through the moisture-resistant protective film 14 and is radiated in the direction of arrow B. In the image-sensing element or television camera (not shown), this optical image is captured, and thus an image signal corresponding to a radiographic image can be obtained.

The side walls of the scintillator panel 1g of this embodiment are fortified by the second protective organic film 19, and hence the mechanical strength of this part can be improved. These side wall parts are not positioned on the light path of the radiation and the visible light which is converted by the scintillator 16, and it is therefore possible to increase the thickness of the side wall parts so as to obtain the necessary strength without influencing the radiation characteristic and optical characteristic of the scintillator 16. Conversely, the substrate 10 part can be made with a large surface area while remaining thin, thereby enabling a combination of a large-sized screen with high resolution and a high S/N ratio.

In order to activate the scintillator 16, annealing processing, in which the scintillator 16 is heated following formation, is sometimes performed. In the scintillator panel 1 according to the present invention, this annealing processing is possible either before or after the formation process of the second protective organic film 19 (see FIG. 31E).

When annealing processing is performed before the second protective organic film 19 is formed, there is a possibility that damage such as pin holes will occur in the exposed part of the first protective organic film 14 due to the heat during annealing processing. However, by blocking these damaged parts, scintillator components or moisture are prevented from penetrating into the metal reflective film 12 during use following manufacture.

When annealing processing is performed after the second protective organic film 19 is formed, the second protective organic film functions as a moisture-resistant protective film to prevent excess heat from being applied to the first protective organic film 11 during annealing processing, and hence damage to the first protective organic film 14 may be suppressed. In this case, the second protective organic film 19 requires better heat resistance than the first protective organic film, and polyimide resin is suitable since it has good heat resistance.

As noted above, the second protective organic film 19 is not positioned on the light path of the output light from the scintillator 16. Consequently, it is preferable that the second protective organic film 19 be opaque with respect to the light generated by the scintillator 16 (preferably with 50% transmissivity or less, and more preferably 10% transmissivity or less). When the second protective organic film 19 is made opaque in this manner, ambient light passes through the second protective organic film 19 to enter the scintillator 16, where this ambient light is refracted and reflected, thereby preventing its intrusion into the output image as noise. As a result, an output image with a good S/N ratio can be obtained.

Figure 30:
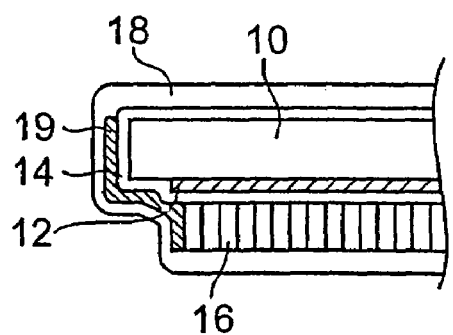
FIG. 30 is a view showing an example of modification thereof.

The second protective organic film 19 does not necessarily have to cover the area extending from the peripheral edges of the rear surface of the substrate 10 to the peripheral edges of the top surface of the scintillator 16, and it is sufficient if the film 19 covers the side walls of the substrate 10 and scintillator 16 and the first protective organic film 14 therebetween, as is shown in FIG. 30. In so doing, the optical output surface may be made larger.

Figure 32:
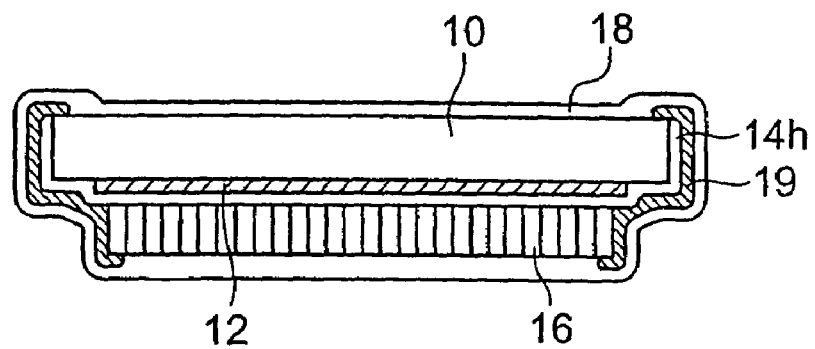
FIGS. 32 and 33 are sectional constitutional views showing sixteenth and seventeenth embodiments of the scintillator panel according to the present invention.

FIG. 32 is a sectional view showing the sixteenth embodiment of the scintillator panel according to the present invention. This scintillator panel 1h differs from that of the fifteenth embodiment in that a polyimide film is used as the protective organic film 14h, and this film is not formed up to the rear surface of the substrate 10.

This polyimide protective organic film 14h may be manufactured following the making process of the metal reflective film 12 shown in FIG. 31B by applying polyimide resin over the metal reflective film 12 down to the side walls of the substrate 10 at a constant thickness (10 μm) and causing this resin to harden.

When the first protective organic film 14h is formed with heat-resistant polyimide resin, it is difficult to envelop the entire substrate 10 therein, as with the polyparaxylylene first protective organic film 14 in the first embodiment. However, in the annealing processing step to activate the scintillator 16, damage to the protective organic film 14h can be suppressed.

Figure 33:
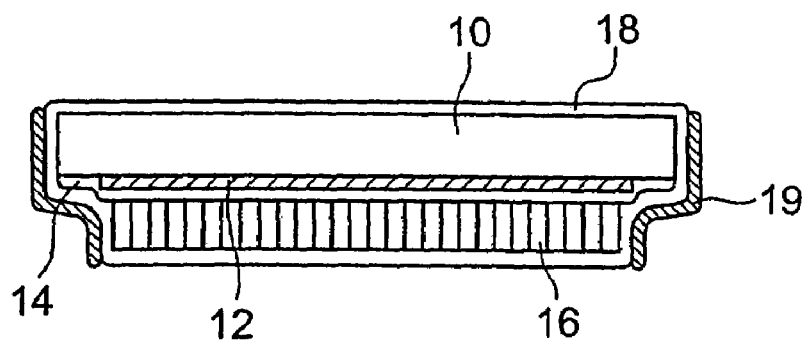

FIG. 33 is a sectional view showing the seventeenth embodiment of the scintillator panel according to the present invention. The scintillator panel 1i of this embodiment differs from the scintillator panel 1 of the second embodiment in that the second protective organic film 19 is formed on the outside of the moisture-resistant protective film 18. In other words, the moisture-resistant protective film 18 in this scintillator panel 1b is formed so as to substantially cover the entire panel from the top surface to the side walls of the scintillator 16, the surfaces of the first protective organic film 14 on the periphery of the scintillator 16, and from the side walls to the rear surface of the substrate 10. Further, a second protective organic film 19 is configured in the form of a picture frame, covering the side walls of the scintillator panel 1i, that is, covering the moisture-resistant protective film 18 from the side walls of the scintillator 16 to the side walls of the substrate 10.

Here, it is sufficient if the second protective organic film 19 extends to at least the edges of the side walls of the substrate 10 and the scintillator 16, but it is also acceptable for the film to extend to the rear surface of the substrate 10 or the top surface of the scintillator 16.

Figure 34A:
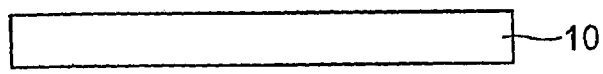
FIGS. 34A through 34E are explanatory views of the making process of the scintillator panel of FIG. 33.
Figure 34B:
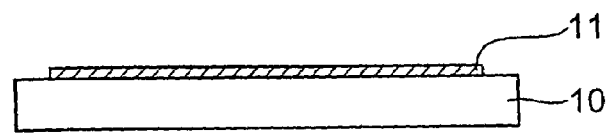
Figure 34C:
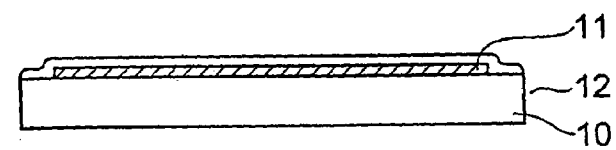

Next, the method of making this scintillator panel 1i will be explained. This method is identical to the making process for the scintillator panel 1g illustrated in FIGS. 31A and 31B up to the manufacture of the metal reflective film 12 (FIGS. 34A and 34B). Thereafter, polyimide resin is painted onto the metal reflective film 12 and the surfaces of the substrate 10 around the periphery of the metal reflective film 12, and then caused to harden, thereby forming the first protective organic film 14 in planar form, covering the metal reflective film 12 (see FIG. 34C).

Figure 34D:
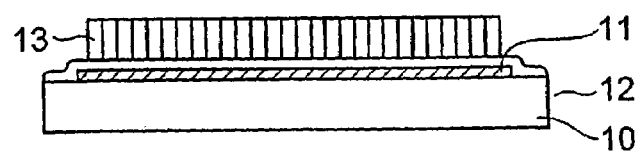
Figure 34E:
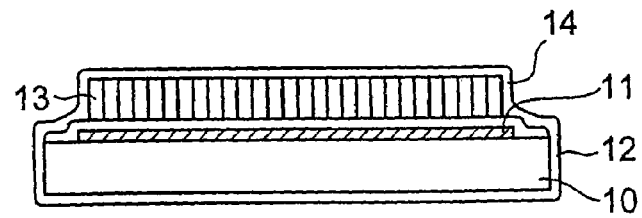

Next, similarly to the process in FIG. 31D, a large number of Tl-doped CsI needle crystals are grown by deposition in a predetermined area on the surface of the first protective organic film 14 on the metal reflective film 12, and thus the scintillator 16 is formed (see FIG. 34D). Then, the scintillator 16 is covered by a polyparaxylylene moisture-proof organic film 18 (see FIG. 34E). Then, polyimide resin is painted over the moisture-proof organic film 18 onto the side walls of the substrate 10 and the scintillator 16 and all of the intermediate parts therebetween, and caused to harden, thereby forming the frame-shaped second protective organic film 19 and completing the scintillator panel 1i as shown in FIG. 33. Similarly to the fourteenth embodiment, the second protective organic film 19 may be formed by affixing resin molded into the form of a tape or film rather than by painting on the resin.

In this embodiment, since the scintillator panel 1j, including the moisture-proof organic film 18, is covered by the protective organic film 19, and is thus supported at the side wall parts, there is no danger of damage to the moisture-proof organic film 18, and peeling caused by damage to the moisture-proof organic film 18 can be suppressed.

Figure 35:
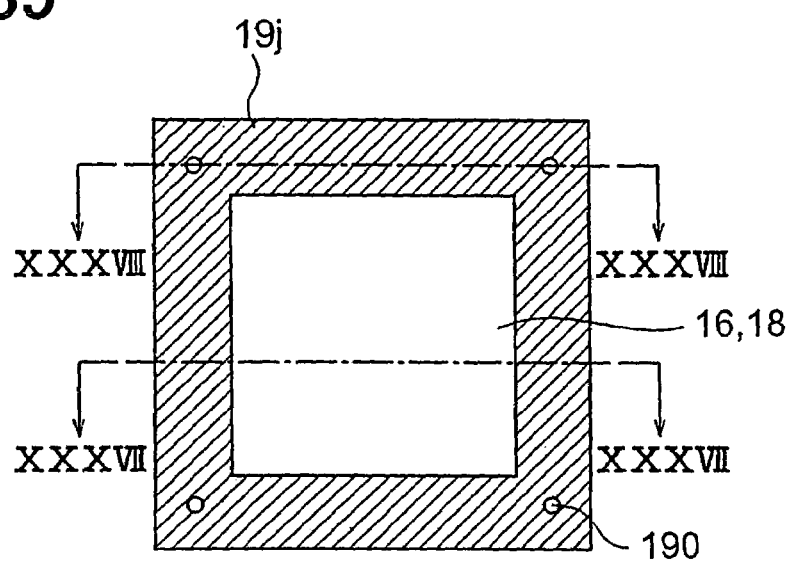
FIGS. 35 through 38 are a front view, a rear view, and sectional views along the XXXVII-XXXVII line and the XXXVIII-XXXVIII line of an eighteenth embodiment of the scintillator panel according to the present invention.
Figure 36:
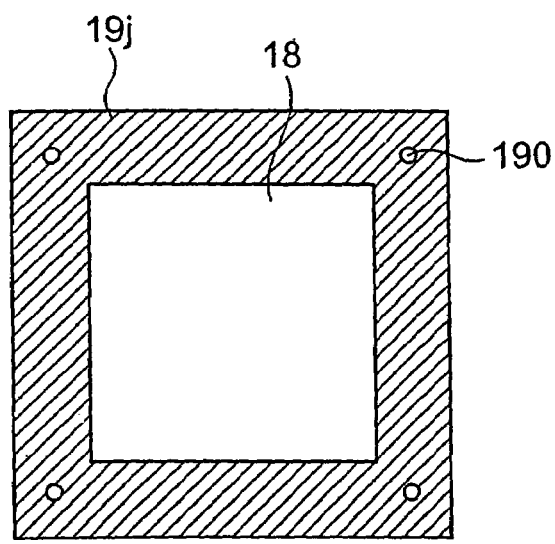
Figure 37:
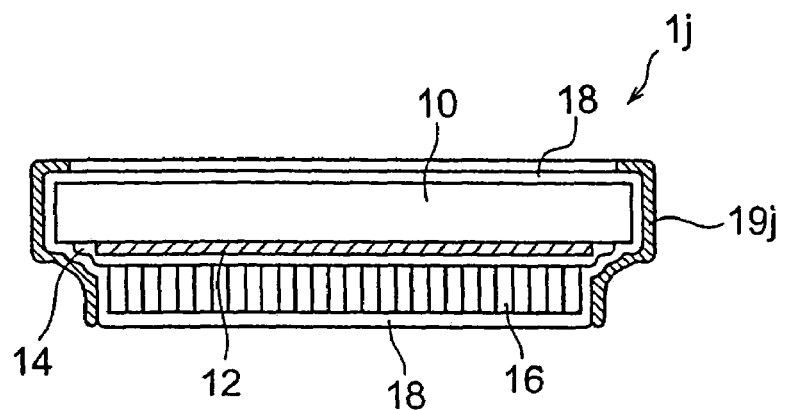
Figure 38:
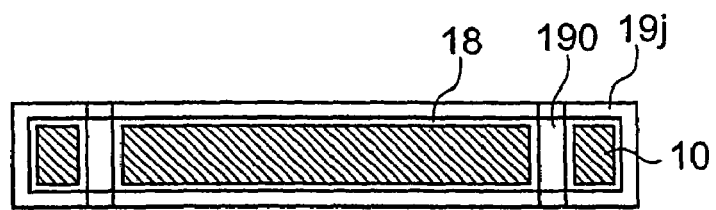

Next, one example of supporting and fixing the scintillator panel according to the present invention will be explained. FIGS. 35 through 38 are views showing an eighteenth embodiment of the scintillator panel according to the present invention. FIG. 35 is a front view of this scintillator panel 1j seen from the scintillator 16 side, FIG. 36 is a back view seen from the substrate 10 side, and FIGS. 37 and 38 are sectional views on the XXXVII-XXXVII line and the XXXVIII-XXXVIII line of FIG. 35 respectively.

This scintillator panel 1j has the same basic structure as the scintillator panel 1i of the sixteenth embodiment shown in FIG. 33, but differs therefrom in that the substrate surface and the width of the rear surface part of the second protective organic film 19j are comparatively larger.

In the scintillator panel 1j, the laminated structure of the metal reflective film 12, the first protective organic film 14, and the scintillator 16 is formed in the central part of the substrate 10, providing space on the periphery of the scintillator 16. In the four corners of the substrate 10 (within this area of space on the periphery), through holes 190 are provided through the substrate 10. These throughholes 190 are provided in the substrate 10 in advance, prior to the formation of the scintillator 16.

The scintillator panel 1j can be fixed by inserting and fixing bolts, screws or the like into these through holes 190. Since the second protective organic film 19j protects the subjacent substrate 10 and moisture-resistant organic film 18, damage thereto during fixing can be suppressed. If the moisture-resistant film 18 were to lie exposed, the moisture-resistant film 18 would be damaged when screws and the like were inserted and tightened, allowing moisture to enter the interior through [the damaged area]. However, since the moisture-resistant organic film 18 is protected by the second protective organic film 19c, damage is unlikely to occur to the moisture-resistant organic film even when screws and the like are inserted and tightened. In FIG. 37, the scintillator 16 is depicted in a protruding state; however, the second protective organic film 19j may be formed thicker than the scintillator 16 in order to strengthen its protecting function.

It is acceptable to form the second protective organic film 19j so as to cover the entire rear surface of the scintillator panel 1j. However, in order to obtain a clearer output image, it is preferable not to form the second protective organic film 19j on the radiographic image input part.

In the above-described embodiments, CsI (Tl) is used as the scintillator 16. However, the present invention is not limited to this, and CsI (Na), NaI (Tl), LiI (Eu), KI (Tl), or the like may be used.

Figure 13:
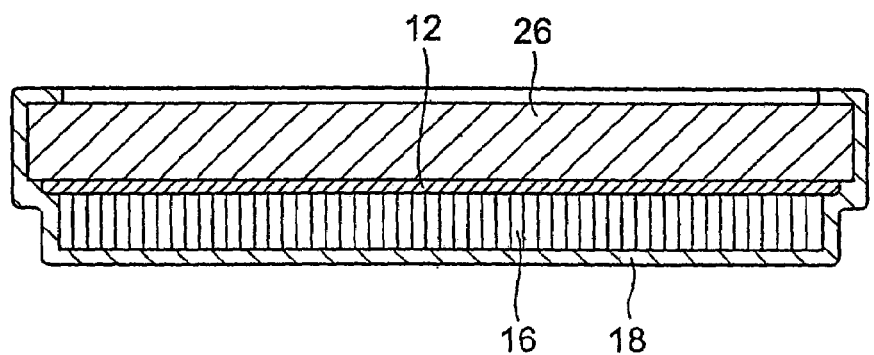
FIG. 13 is a sectional view of a modification of this embodiment.

In the above-described embodiments, the entire surfaces of the scintillator 16 and substrate (the surface with the scintillator formed and a surface on the opposite side, i.e., the radiation incident surface) are covered with the polyparaxylylene film 18, thereby making the scintillator completely resistant against water vapor. When the scintillator 16 and at least part of the surface of the substrate are covered with the polyparaxylylene film 18, as shown in FIG. 13, the water-vapor resistance of the scintillator can be made higher than in a case wherein only the scintillator is covered.

Polyparaxylylene in the above-described embodiments includes, in addition to polyparaxylylene, polymonochloroparaxylylene, polydichloroparaxylylene, polytetrachloroparaxylylene, polyfluoroparaxylylene, polydimethylparaxylylene, polydiethylparaxylylene, and the like.

According to the scintillator panel of the present invention, any change in properties of the reflective metal thin film based on water contained in the scintillator in a small amount can be prevented, and the function of the reflective metal thin film as a reflecting film can be prevented from degrading. Hence, an increased optical output of the scintillator panel can be maintained. When a glass substrate is used, even a scintillator panel having a large area can keep its performance high.

In addition, according to the radiation image sensor of the present invention, since the scintillator panel can maintain an increased optical output, the output of the radiation image sensor can be maintained. When a glass substrate is used, even a radiation image sensor having a large area can keep its performance high.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A panel for detection of radiation, comprising:
   a radiation transmitting conductive substrate;
   a metal film having a surface that reflects light;
   an intermediate film formed of an inorganic non-conductive film provided between and contacting the metal film and the conductive substrate to prevent the metal film from contacting the conductive substrate;
   a protective film provided on the metal film; and
   a converter for converting a radiation image into a visible image.

* * * * *